US012184151B2

(12) United States Patent
Moser

(10) Patent No.: US 12,184,151 B2
(45) Date of Patent: Dec. 31, 2024

(54) MOTOR HOUSING FOR AN AXIAL FLUX MOTOR

(71) Applicant: BorgWarner Inc., Auburn Hills, MI (US)

(72) Inventor: Tobias Moser, Pfullendorf (DE)

(73) Assignee: BorgWarner Inc., Auburn Hills, MI (US)

( * ) Notice: Subject to any disclaimer, the term of this patent is extended or adjusted under 35 U.S.C. 154(b) by 243 days.

(21) Appl. No.: 17/854,186

(22) Filed: Jun. 30, 2022

(65) Prior Publication Data
US 2023/0361646 A1  Nov. 9, 2023

(30) Foreign Application Priority Data

May 6, 2022 (DE) ...................... 10 2022 111 383.3

(51) Int. Cl.
*H02K 5/20* (2006.01)
*H02K 5/18* (2006.01)
*H02K 15/14* (2006.01)

(52) U.S. Cl.
CPC .............. *H02K 5/203* (2021.01); *H02K 5/18* (2013.01); *H02K 15/14* (2013.01)

(58) Field of Classification Search
CPC ............. H02K 5/203; H02K 5/18; H02K 9/19
See application file for complete search history.

(56) References Cited

U.S. PATENT DOCUMENTS

2021/0351658 A1\* 11/2021 Jore ...................... H02K 5/203
2023/0361646 A1\* 11/2023 Moser .................... H02K 5/18

FOREIGN PATENT DOCUMENTS

| CN | 209994251 U | 1/2020 |
| DE | 102014221648 A1 | 4/2016 |
| WO | 2020072734 A1 | 4/2020 |

OTHER PUBLICATIONS

German Search Report issued on Mar. 24, 2023, in German Application No. 10 2022 111 383.3.

\* cited by examiner

*Primary Examiner* — Robert W Horn
(74) *Attorney, Agent, or Firm* — Eric L. Doyle; Stephan A. Pendorf; Patent Central LLC

(57) ABSTRACT

A motor housing 20 for an axial flux motor 10. The motor housing 20 includes at least one housing portion 22, 24 which is of at least partially double-walled configuration, in order to configure an internal cooling channel 40 in the housing portion 22, 24. The cooling channel 40 extends in a substantially annular manner in the circumferential direction 6 between an inlet 41a and an outlet 41b, in order, during operation, to produce a first cooling flow 82 which flows substantially in the circumferential direction 6 through the cooling channel 40. Furthermore, the cooling channel 40 includes a plurality of transverse ribs 50.

14 Claims, 8 Drawing Sheets

A - A (from Fig. 5b)

B - B (from Fig. 5a)

C - C (from Fig. 5b)

MOTOR HOUSING FOR AN AXIAL FLUX MOTOR

TECHNICAL FIELD

The present invention relates to a motor housing for an axial flux motor with an internal cooling channel. In particular, the invention relates to an axial flux motor for a high-voltage fan with a motor housing of this type.

BACKGROUND

Electric machines have always been used in many technical areas for the production of kinetic energy. An electric machine (also called an electric motor or an E-motor) is an electric unit which can convert electric energy into mechanical energy. Kinetic energy can in turn be produced by way of the mechanical energy, by way of which kinetic energy other units can be driven. Here, the electric motor generally comprises a stator and a rotor which are accommodated in a motor housing. The stator is fixed in its position, and the rotor moves relative to the stator and is usually seated on a drive shaft which corotates with the rotor. The rotational energy can be transmitted via the shaft to other units. Most electric motors produce energy by way of a magnetic field and a winding current.

A distinction can be made fundamentally between radial flux machines and axial flux machines.

In the case of radial flux machines, the rotor as a rule consists of a cylindrical body, the entire circumference of which supports magnets. The stator is as a rule of hollow-cylindrical configuration, and surrounds the rotor at a radial spacing. On its inner side, the stator supports a plurality of circumferentially distributed winding elements. Each winding element in each case comprises a stator tooth which extends, starting from a stator yoke, towards the rotor in the radial direction. The stator tooth is wound around by a wire made from a metallic material of good conductivity, in order to form the winding. When the windings are loaded with current, the rotor which is fastened to the output shaft of the motor is subjected to a torque which results from the magnetic field, the produced magnetic flux being a radial flux in the case of a radial flux machine.

In the case of axial flux machines, the rotor as a rule consists of a disc-shaped rotor body with two circular surfaces which are connected by a thickness, the disc being delimited by way of an outer collar and an inner circumference which delimits a space for a rotating shaft. At least two permanent magnets are usually attached to at least one of the two circular surfaces of the rotor body which is called a supporting face. The stator is as a rule of disc-shaped configuration and is arranged fixed to the rotor at an axial spacing. On its side which faces the rotor, the stator supports a plurality of circumferentially distributed winding elements. Each winding element in each case comprises a stator tooth which extends, starting from a stator yoke, towards the rotor in the axial direction. The stator tooth is wound around by a wire made from a metallic material of good conductivity, in order to form the winding. When the windings are loaded with current, the rotor which is fastened to the output shaft of the motor is subjected to a torque which results from the magnetic field, the produced magnetic flux being an axial flux in the case of an axial flux machine. The rotor of an axial flux machine can be driven by a stator on one side of the rotor or by two stators on both sides of the rotor. In the case of a rotor with a single air gap which is intended to be operated by way of a single stator, a single circular surface of the rotor body frequently supports the magnets. In the case of a rotor with two air gaps which is intended to be operated by way of two stators, the two circular surfaces frequently support the magnets. The magnets are held in each case on the circular surface by way of holding means, a spacing being left between the at least two magnets on the same surface. In the case of the two variants, the same magnets can also be secured in the rotor body in such a way that they bear against the two circular surfaces.

The constant development of electric motors and the trend to use electric current as energy carrier and energy source leads to a continuous expansion of the application portfolio of electric motors. Here, electric motors are not only used in the case of small electronic units such as notebooks or domestic appliances which are usually operated in the low-voltage area. Electric motors of relatively large dimensions are more and more frequently also being used in the high-voltage area in the case of operating voltages of up to 800 Volts or 850 Volts and more.

During operation, electric motors as a rule generate a large quantity of heat, in particular in the stators. Excessive heat can damage internal components, can limit the power output provided by the machine and/or can impair the longevity of the machine. Electric motors can be equipped with fans or radial and/or axial ventilation openings in the motor housing which can dissipate at least part of the heat from the machine, by drawing cooling air through various channels in the motor housing. The dissipation of heat is the limiting factor for motor dimensioning and power output. The motor current is directly linked to the output power and the heat generated by the motor. In the case of electric motor applications in the high-voltage area, in particular, in the case of which high motor power outputs are required, ensuring a sufficient dissipation of heat is decisive. For this purpose, a powerful heat dissipation means is necessary which, however, is frequently associated with increased component complexity, increased manufacturing costs and increased installation space requirement.

It is an object of the present invention to provide an axial flux motor with an improved powerful, compact heat dissipation means.

SUMMARY OF THE INVENTION

The present invention relates to a motor housing for an axial flux motor according to claim 1. Furthermore, the invention relates to an axial flux motor with a motor housing of this type, and to a high-voltage fan with a corresponding axial flux motor.

The motor housing according to the invention for an axial flux motor comprises at least one housing portion. The at least one housing portion is of at least partially double-walled configuration, in order to configure an internal cooling channel in the housing portion. The cooling channel extends in a substantially annular manner in the circumferential direction between an inlet and an outlet, in order, during operation, to produce a first cooling flow which flows substantially in the circumferential direction through the cooling channel. In addition, the cooling channel comprises a plurality of transverse ribs. Annular can be understood to mean, in particular, annular portion-shaped, and can extend merely over a circular segment which comprises less than 360°. By way of the enabled first cooling flow in the circumferential direction, pressure losses can be decreased, for example, in comparison with a pure labyrinth-like flow. By way of the transverse ribs, the dissipation of heat can firstly be increased, by way of an increase in the surface area of the cooling channel. Furthermore, the transverse ribs have a reinforcing effect on the motor housing and therefore make it more robust, which is advantageous, in particular, in the case of use in a motor vehicle. The combined production of the first cooling flow in combination with an increased dissipation of heat by way of the increased surface area of the cooling channel, and turbulence on one or two adjacent transverse ribs are particularly advantageous. Therefore, an axial flux motor with an improved powerful, compact heat dissipation means can be provided, by the motor housing being configured according to the invention. As a result of the integration of the cooling into a double-walled housing portion of the motor housing, the interior of the motor housing, in which the rotor and stator are arranged, can be separated from the cooling.

In refinements of the motor housing, the transverse ribs can extend along a rib width laterally with respect to the circumferential direction. In other words, the transverse ribs can extend in a first lateral direction. The first lateral direction can be substantially orthogonal with respect to the circumferential direction, and can define the rib width. In particular, the transverse ribs can extend along the rib width in a substantially radial direction. In other words, transverse ribs can extend laterally in a substantially radial direction, or can extend laterally with respect to the circumferential direction in a substantially radial direction. As an alternative or in addition, the transverse ribs can extend along their rib width at least partially between a first lateral channel wall and a second lateral channel wall of the cooling channel. As an alternative or in addition, the transverse ribs can extend along their rib width at least partially between a radially inner channel wall and a radially outer channel wall of the cooling channel. As an alternative or in addition, the transverse ribs can also extend completely from the radially inner channel wall as far as the radially outer channel wall. As an alternative or in addition, the transverse ribs can have, along their rib width, a radially inner rib portion, a radially outer rib portion and a middle rib portion which lies in between. Turbulence and, as a result, improved thorough mixing of the cooling fluid which flows through the cooling channel can be achieved by way of the extent of the transverse ribs laterally with respect to the circumferential direction.

In refinements which can be combined with any one of the preceding refinements, the plurality of transverse ribs can be configured and protrude into the cooling channel so as, during operation, to produce a second cooling flow which flows through the cooling channel in a laterally meandering manner with respect to the first cooling flow. In particular, the transverse ribs can be configured in such a way that the second cooling flow is produced and, at the same time, the first cooling flow remains enabled. As a result of the meandering second cooling flow which is produced, radially inner and outer edge regions and corners, in particular, can be flushed in an improved manner. In addition, the turbulence and, as a result, the possible dissipation of heat are increased by way of the meandering course. The combined production of the first and the second cooling flow is particularly advantageous, which cooling flows interact with one another during operation and therefore lead to desired turbulent flow regions and, as a result, to an efficient heat exchange in the cooling channel. As a result of the transverse ribs, the second cooling flow can be produced and can be guided along the transverse ribs and/or the rib width.

In refinements which can be combined with the preceding refinement, the transverse ribs can protrude along a rib height in the axial direction into the cooling channel in such a way that, during operation, the second cooling flow flows through the cooling channel in a laterally meandering manner between a radially inner region of the cooling channel and a radially outer region of the cooling channel.

In refinements which can be combined with any one of the preceding refinements, the housing portion can comprise a first wall portion and a second wall portion. The cooling channel can be formed between the first wall portion and the second wall portion. In particular, the cooling channel can be formed in the axial direction between surfaces, directed axially towards one another, of the first and the second wall portion. In particular, the cooling channel can be formed in the radial direction between a radially inner channel wall and a radially outer channel wall. The radially inner channel wall and/or the radially outer channel wall can be a part wall of the first and/or the second wall portion.

In refinements which can be combined with the preceding refinement, at least some of the transverse ribs of one of the first wall portion and/or the second wall portion can protrude in the axial direction into the cooling channel, with the result that a channel height of the cooling channel is reduced in the region of a respective transverse rib. In other words, the transverse ribs can be arranged on the first and/or the second wall portion. In refinements, the channel height of the cooling channel can extend in the axial direction between surfaces, directed axially towards one another, of the first and the second wall portion. In particular, as viewed over their rib width, at least some of the transverse ribs can protrude to a different extent in the axial direction into the cooling channel, with the result that the cooling channel has different channel heights as viewed over the respective rib width. In other words, the at least some transverse ribs can have different rib heights from the respective terminating channel wall. In other words, at least some of the transverse ribs can have a non-constant rib height. As a result of the reduction of the channel height, a nozzle effect can be achieved in the region of the respective transverse rib, and an expansion can be achieved downstream of the respective transverse rib in the flow direction, which expansion leads to turbulence. An axial extent of different magnitude of the transverse ribs can achieve preferred flow guidance of cooling fluids. In the region of a smaller axial extent, in particular, a partial flow in the circumferential direction, for example from one rib intermediate region to an adjacent rib intermediate region, can be preferred. A more pronounced flow in the lateral direction, in particular along the rib width or in a rib intermediate region, can be achieved in the region of a greater axial extent.

In refinements which can be combined with the preceding refinement, at least some of or all the transverse ribs can be arranged on the first wall portion. As an alternative, at least some of or all the transverse ribs can be arranged on the second wall portion. In refinements, at least some transverse ribs can be arranged on one of the first and the second wall portion, it being possible for at least one transverse rib, in particular the remaining ones of the plurality of transverse ribs, to be arranged on the other one of the first and the second wall portion. In refinements, the transverse ribs can be arranged in an alternating manner or in a certain sequence on the first and the second wall portion. For example, two transverse ribs can be arranged on the first wall portion and two transverse ribs can be arranged on the second wall portion in an alternating manner. For example, a certain first number of transverse ribs can be arranged on the first wall portion and a certain second number of transverse ribs can be arranged on the second wall portion in an alternating manner. The certain first number and the certain second number can be identical or different or can be variable in the case of a change. For example, the certain first number and the certain second number can comprise one, two, three, four, five, six, seven, eight, nine or ten or more transverse ribs, in particular from one to five. Intermediate values or ranges are also possible.

In refinements which can be combined with any one of the preceding refinements, at least some of the transverse ribs of the first wall portion can protrude in the axial direction with respect to the second wall portion into the cooling channel only to such an extent that they are still spaced apart from the second wall portion. As an alternative or in addition, at least some of the transverse ribs of the second wall portion can protrude in the axial direction with respect to the first wall portion into the cooling channel only to such an extent that they are still spaced apart from the first wall portion. As a result, at least a minimum axial channel height of the cooling channel in the region of a respective transverse rib can be ensured. This in turn makes a circumferential flow over the entire radial extent of a respective transverse rib possible.

In refinements which can be combined with any one of the preceding refinements, at least some transverse ribs can protrude into the cooling channel in the axial direction to a lesser extent in one of a radially inner rib portion or a radially outer rib portion than in the respective other rib portion, in order to form an increased rib passage. Cooling fluids, in particular the second cooling flow, can flow through the increased rib passage from one rib intermediate region into an adjacent rib intermediate region. In other words, flow guidance of cooling fluids can be achieved by way of the provision of an increased rib passage. A partial flow can be guided in the circumferential direction, for example from one rib intermediate region to an adjacent rib intermediate region, in particular, in the region of an increased rib passage.

In refinements which can be combined with the preceding refinement, a channel height of the cooling channel can be greater in a region of the increased rib passage than in a region of the respective other rib portion. As an alternative or in addition, a channel height of the cooling channel in a region of the increased rib passage can be at least 1.0 mm. As an alternative or in addition, a channel height of the cooling channel in a region of the increased rib passage can preferably be at least 2.0 mm. A channel height of the cooling channel in a region of the increased rib passage can particularly preferably be at least 3.0 mm. In refinements, a channel height of the cooling channel in a region of the increased rib passage can be between 1.0 mm and 10.0 mm, preferably between 2.0 mm and 8.0 mm, or between 3.0 mm and 6.0 mm. In particularly advantageous refinements, a channel height of the cooling channel in a region of the increased rib passage can be, for example, 4.0 mm±0.5 mm, or 5.0 mm±0.5 mm. Channel height regions of this type in the region of the increased rib passage can make a meandering flow from one rib intermediate region to an adjacent rib intermediate region possible. Intermediate values and/or intervals are also possible here.

In refinements which can be combined with any one of the two preceding refinements, the at least some transverse ribs in the respective other rib portion can form a reduced rib passage. The reduced rib passage makes a first cooling flow possible, by way of which cooling fluids can flow through the cooling channel in the circumferential direction "above" the transverse ribs. In addition, a type of partial blockage or resistance can be achieved by way of the reduced rib passage, by way of which partial blockage or resistance part of the cooling fluid flow can be guided laterally, in particular along the second cooling flow. In addition, a channel height of the cooling channel can be lower in a region of the reduced rib passage than in a region of the increased rib passage. As an alternative or in addition, a channel height of the cooling channel in a region of the reduced rib passage can be at most 3.0 mm. In refinements, a channel height of the cooling channel in a region of the reduced rib passage can preferably be at most 2.0 mm. A channel height of the cooling channel in a region of the reduced rib passage can particularly preferably be at most 1.0 mm. In refinements, a channel height of the cooling channel in a region of the reduced rib passage can be between 0.5 mm and 5.0 mm, preferably between 0.5 mm and 4.0 mm, or between 0.5 mm and 2.5 mm. In particularly advantageous refinements, a channel height of the cooling channel in a region of the reduced rib passage can be, for example, 1.0 mm±0.5 mm, or 1.5 mm±0.5 mm. Channel height regions of this type in the region of the reduced rib passage can make a reliable circumferential flow with merely moderate pressure losses and at the same time effective lateral flow guidance possible. Intermediate values and/or intervals are also possible here.

In refinements which can be combined with any one of the three preceding refinements, the at least some transverse ribs can protrude over a large part of their rib width in the axial direction into the cooling channel only to such an extent that a channel height of the cooling channel is at least greater than 0.0 mm over the entire rib width. In particular, the at least some transverse ribs can protrude over their entire rib width in the axial direction into the cooling channel only to such an extent that a channel height of the cooling channel is at least greater than 0.0 mm over the entire rib width. As a result, the first cooling flow can remain enabled in the circumferential direction over a large part or the entire rib width. In addition, the channel height of the cooling channel over a large part of the rib width and/or over the entire rib width can be at least 0.5 mm, preferably at least 1.0 mm and particularly preferably at least 1.5 mm. In refinements, the channel height of the cooling channel over a large part of the rib width and/or over the entire rib width can be between 0.5 mm and 2.5 mm. In advantageous refinements, the channel height of the cooling channel over a large part of the rib width and/or over the entire rib width can be, for example, 1.0 mm±0.5 mm, or 1.5 mm±0.5 mm. In these particularly advantageous refinements, a circumferential flow can be made possible and, at the same time, a pressure loss can be kept low.

In refinements which can be combined with any one of the four preceding refinements, at least two transverse ribs of the at least some transverse ribs can be configured and arranged adjacently in such a way that the increased rib passage of the one of the two transverse ribs and the reduced rib passage of the other one of the two transverse ribs is arranged on the respective radially inner rib portion or on the respective radially outer rib portion. In particular, one transverse rib can have its increased rib passage on its radially inner rib portion, and an adjacent transverse rib can have its reduced rib passage on its radially inner rib portion. A direction change of the laterally meandering second cooling flow can be made possible by way of an arrangement of this type.

In refinements which can be combined with any one of the preceding refinements, a rib intermediate region can be configured between in each case two adjacent transverse ribs. During operation, the second cooling flow can flow laterally from one increased rib passage to an adjacent increased rib passage through the rib intermediate region. In particular, in operation, the second cooling flow can flow radially on the outside or radially on the inside from one increased rib passage to an adjacent increased rib passage. The meandering flow can flow between the transverse ribs in a deeper region of the cooling channel, that is to say closer to the rib base (for example, where the rib emerges from the channel wall). At the same time, the circumferential flow can flow in an upper region of the cooling channel, with the result that satisfactory thorough mixing can be provided by way of the two flows which interact with one another.

In refinements which can be combined with any one of the preceding refinements, a large part of the at least some transverse ribs which have an increased rib passage can be configured and arranged adjacently with respect to one another in such a way that the increased rib passage between adjacent transverse ribs is configured in an alternating manner on the respective radially inner rib portion and on the respective radially outer rib portion. Directional changes of the meandering flow and, as a result, satisfactory flushing of the cooling channel can be provided by way of the alternating arrangement of the increased rib passages. As an alternative or in addition, in refinements with a middle rib portion between the radially inner and the radially outer rib portion, the increased rib passage between adjacent transverse ribs can also be configured in an alternating manner in the middle rib portion and one of the radially inner rib portion or the radially outer rib portion. A more pronounced circumferential component and a lower pressure loss can also be achieved in the middle rib portion by way of increased rib passages.

In refinements which can be combined with any one of the preceding refinements, a rib intermediate region can be configured between in each case two adjacent transverse ribs. In addition, a channel height in a rib intermediate region can be greater than in the region of the transverse ribs. As an alternative or in addition, the rib intermediate region can be configured in the circumferential direction between two adjacent transverse ribs.

In refinements which can be combined with the preceding refinement and in which at least some of the transverse ribs have increased rib passages, the increased rib passages can provide a passage from one rib intermediate region to an adjacent rib intermediate region.

In refinements which can be combined with any one of the two preceding refinements, a flow guiding arrangement can be configured in at least one rib intermediate region. In particular, a flow guiding arrangement can be configured in each rib intermediate region.

In refinements which can be combined with the preceding refinements, the flow guiding arrangement can be configured to swirl the second cooling flow which flows laterally with respect to the circumferential direction, in particular in the radial direction.

In refinements which can be combined with any one of the two preceding refinements, the flow guiding arrangement can comprise an undulating surface. As an alternative or in addition, the undulating surface can comprise one or more undulations. In refinements, the undulating surface can comprise peaks and troughs. In addition, the peaks and troughs of the undulating surface can be arranged in an alternating manner along the rib intermediate region as viewed in the radial direction. As an alternative or in addition, peaks and troughs can extend substantially in the circumferential direction. The undulating surface can increase the surface area for cooling in a particularly efficient way, and can contribute to improved thorough mixing of the cooling fluids.

In refinements which can be combined with any one of the three preceding refinements, the flow guiding arrangement can protrude from the first wall portion in the axial direction into the cooling channel. As an alternative or in addition, the flow guiding arrangement can protrude from the second wall portion in the axial direction into the cooling channel. In particularly preferred refinements, the flow guiding arrangement can be configured in the first wall portion.

In refinements which can be combined with any one of the three preceding refinements, the flow guiding arrangement can protrude from one of the two adjacent transverse ribs into the rib intermediate region which is formed by way of these adjacent transverse ribs. As an alternative or in addition, the flow guiding arrangement can protrude from both of the two adjacent transverse ribs into the rib intermediate region which is formed by way of these adjacent transverse ribs. In refinements, the flow guiding arrangement can extend between the two adjacent transverse ribs, in the rib intermediate region which is formed by way of these adjacent transverse ribs. As an alternative or in addition, the flow guiding arrangement can extend in rib form from the one transverse rib to the other transverse rib. In particular, the flow guiding arrangement can extend in rib form completely from the one transverse rib to the other transverse rib. In this way, peaks and/or troughs of the undulating surface can be formed.

In refinements which can be combined with any one of the preceding refinements, the cooling channel can be delimited in the radial direction along a channel width by way of a radially inner channel wall and by way of a radially outer channel wall. In other words, the cooling channel can be configured in the radial direction between a radially inner channel wall and a radially outer channel wall.

In refinements which can be combined with any one of the preceding refinements, the housing portion can comprise a plurality of fastening indentations, distributed in the circumferential direction, for attaching a stator to the housing portion. As an alternative or in addition, the radially outer channel wall in a respective portion of the fastening indentations can be offset inwards in the radial direction by way of them.

In refinements which can be combined with the preceding refinement, the at least some transverse ribs which have an increased rib passage can be configured between two adjacent fastening indentations and can be arranged adjacently with respect to one another in such a way that the increased rib passage between adjacent transverse ribs is arranged in an alternating manner on the respective radially inner rib portion and on the respective radially outer rib portion.

In refinements which can be combined with any one of the two preceding refinements and in which at least some transverse ribs have an increased rib passage, the transverse ribs which are adjacent in each case with respect to a fastening indentation can have configured the increased rib passage on their respective radially outer rib portion. Improved flushing of the corners of the fastening indentation with cooling fluid can be achieved during operation by way of these advantageous refinements. In addition, a formation of bubbles and dead zones of cooling fluid flow can be prevented or at least reduced.

In refinements which can be combined with any one of the preceding refinements, the housing portion can comprise a depression for arranging a stator. As a result, the stator can be arranged closer to the cooling channel, as a result of which a cooling effect can be improved. As an alternative or in addition, the cooling channel can be arranged and configured in such a way that it overlaps the depression in the radial direction. A cooling effect can be improved further by way of the overlap.

In refinements which can be combined with any one of the preceding refinements, the cooling channel can extend in a substantially annular manner in the circumferential direction over a region of approximately between 30° to approximately 360°.

In refinements which can be combined with any one of the preceding refinements, a plurality of internal cooling channels can be configured in the housing portion. In addition, the plurality of internal cooling channels can be arranged adjacently in the circumferential direction. As an alternative or in addition, the plurality of internal cooling channels can in each case have a dedicated inlet and/or outlet. An improved cooling effect can be provided by way of a plurality of cooling channels.

In refinements which can be combined with any one of the preceding refinements, the inlet and the outlet can be arranged adjacently in the circumferential direction. In addition, the inlet and the outlet can be separated fluidically by way of a web. As an alternative or in addition, the web can be configured in the housing portion. In particular, the web can run in the radial direction. As an alternative or in addition, a bypass can be configured in the web. In addition, the bypass can fluidically connect an inlet region of the cooling channel directly to an outlet region of the cooling channel. The bypass can be dimensioned in such a way that only a minimum part volumetric flow of the entire cooling volumetric flow is conducted through the bypass. Facilitation of the emptying of the cooling channel in the installed position can be made possible by way of the bypass.

In refinements which can be combined with any one of the preceding refinements, the housing portion can be of substantially disc-shaped configuration.

In refinements which can be combined with any one of the preceding refinements, the housing portion can be arranged at an axial end of the motor housing.

In refinements which can be combined with any one of the preceding refinements, the motor housing can comprise, furthermore, a central housing for receiving a shaft, a rotor and a stator of the axial flux machine. As an alternative or in addition, the central housing can have an axial housing opening at a first axial end. As an alternative or in addition, the housing portion can be configured as a housing cover. As an alternative or in addition, the housing portion can be arranged at the axial housing opening in order to close the latter. As an alternative or in addition, the first wall portion of the housing portion can be configured as a housing cover. Manufacturing of the cooling channel geometry which is suitable for mass production can be provided in a simple and inexpensive way by way of the integration of the cooling channel into the housing cover. In particular, the housing cover and/or the cooling cover can be produced by way of a die casting method, in particular a low-pressure die casting method with an integrated cooling channel geometry.

In refinements which can be combined with any one of the preceding refinements, the second wall portion can be configured as a cooling cover for closing the cooling channel. In addition, the cooling cover can be manufactured from a sheet metal part. As an alternative or in addition, the cooling cover can be manufactured from aluminium. As an alternative or in addition, the cooling cover can be fastened to the housing cover by way of friction stir welding. As an alternative or in addition, the cooling cover can be fastened to and/or oriented on the housing cover by way of laser welding, by way of a screw connection, by way of clamping, by way of plugging and/or by way of adhesive bonding.

In refinements which can be combined with the preceding refinement, the cooling cover can comprise at least one reinforcing element. In addition, the reinforcing element can comprise at least one elevation and/or at least one depression. As an alternative or in addition, the reinforcing element can be arranged between two adjacent transverse ribs. As an alternative or in addition, the cooling cover can be stamped, in order to form the at least one reinforcing element. By way of the reinforcing element, firstly the structural stability of the motor housing can be increased, in particular in the case of applications in mobile applications. In addition, the reinforcing element, in particular if it comprises at least one elevation and/or depression, can lead to an increase in the surface area, for example a surface area of the cooling channel or an outer cover surface, and to an improvement of the cooling effect as a result.

In refinements which can be combined with any one of the preceding refinements, the motor housing can comprise at least two housing portions. The at least two housing portions can comprise in each case at least one internal cooling channel. As an alternative or in addition, the at least two housing portions can comprise a first housing portion and a second housing portion. In particular, precisely two housing portions can be provided. In refinements, only one of the at least two housing portions can also comprise an internal cooling channel.

In refinements which can be combined with the preceding refinement, a first housing portion of the at least two housing portions can be arranged at a first axial end of the motor housing. As an alternative or in addition, a second housing portion of the at least two housing portions can be arranged at a second axial end.

In refinements which can be combined with any one of the two preceding refinements, at least one first wall portion of the second housing portion can be manufactured integrally with a central housing. As an alternative, at least one first wall portion of the second housing portion can be a component separately from the central housing and can be fastened to the latter.

In refinements which can be combined with any one of the three preceding refinements, the motor housing can comprise at least one further housing portion. In addition, the at least one further housing portion can be arranged between the first housing portion and the second housing portion. As an alternative or in addition, the at least one further housing portion can comprise at least one internal cooling channel.

Furthermore, the present invention relates to an axial flux motor for a fan, the axial flux motor comprising a motor housing in accordance with any one of the preceding refinements. In addition, the axial flux motor comprises a shaft, at least one rotor and at least one stator. The shaft is mounted rotationally in the motor housing. The rotor is arranged fixedly on the shaft in the motor housing for conjoint rotation. The at least one stator is arranged axially adjacently with respect to the rotor in the motor housing.

In refinements of the axial flux motor, the stator can comprise an annular stator yoke. In addition, the stator can comprise a plurality of stator teeth which, distributed in the circumferential direction, extend from the stator yoke in the axial direction.

In refinements of the axial flux motor which can be combined with the preceding refinement, the rotor can comprise a plurality of permanent magnets. The permanent magnets can be arranged distributed in the circumferential direction. As an alternative or in addition, the permanent magnets can be configured in such a way that they in each case form at least one magnetic pole in the axial direction.

In refinements of the axial flux motor which can be combined with any one of the two preceding refinements, the axial flux motor can be configured as a high-voltage axial flux motor for a high-voltage fan of an electric vehicle.

In refinements of the axial flux motor which can be combined with any one of the three preceding refinements, the at least one stator can be arranged on the at least one housing portion. In particular, the at least one stator can be fastened to the at least one housing portion. As a result, an improved cooling effect can be achieved.

In refinements of the axial flux motor which can be combined with any one of the four preceding refinements, the axial flux motor can comprise two stators, between which the rotor is arranged.

In refinements of the axial flux motor which can be combined with any one of the four preceding refinements, the axial flux motor can comprise at least three stators and at least two rotors. In addition, the rotors can be arranged in each case between two stators.

Furthermore, the present invention relates to a fan for an electric vehicle. In particular, the fan is configured as a high-voltage fan. The fan comprises an axial flux motor in accordance with any one of the five preceding refinements. In addition, the fan comprises a fan impeller which is arranged fixedly on the shaft outside the motor housing for conjoint rotation.

DETAILED DESCRIPTION

Figure 1:
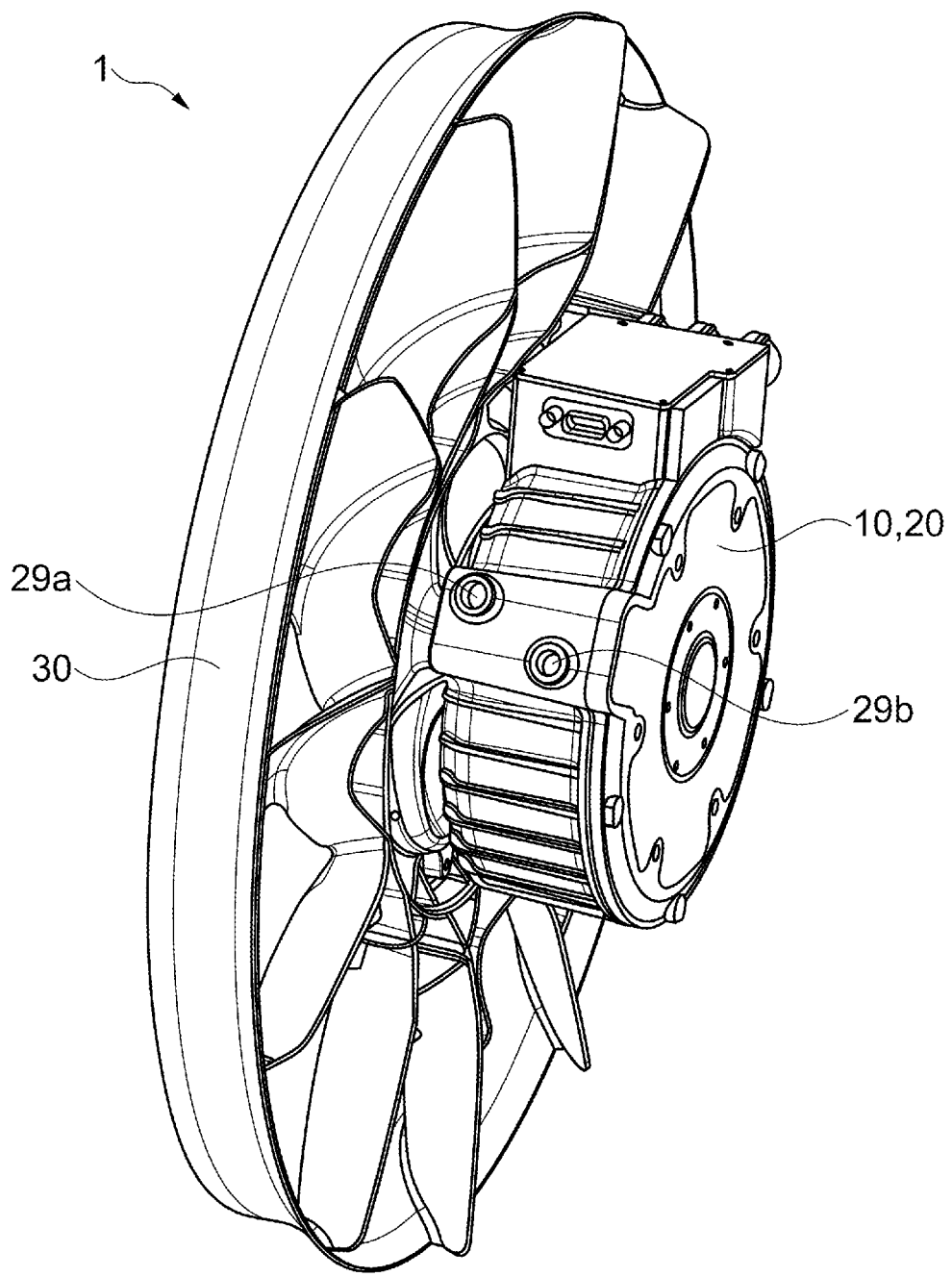
FIG. 1 shows a perspective illustration of the fan according to the invention with an axial flux motor.

In the context of this application, the expressions "axial" and "axial direction" relate to an axis of rotation R of the axial flux motor 10 or the shaft 32 and therefore of the motor housing 20, in which the shaft 32 is arranged. With reference to the figures (see, for example, FIG. 2a), the axial direction of the axial flux motor 10 or the motor housing 20 is shown by way of the reference sign 2. Here, a radial direction 4 relates to the axis/axial direction 2 of the axial flux motor 10 or the motor housing 20. A circumference or a circumferential direction 6 likewise relates here to the axis/axial direction 2 of the axial flux motor 10 or the motor housing 20.

FIG. 1 shows an exemplary fan 1 according to the present invention. The fan 1 comprises an axial flux motor 10 with a motor housing 20 and a fan impeller 30 which can be driven by way of the axial flux motor 10. For this purpose, the fan impeller 30 is arranged fixedly on a shaft 32 of the axial flux motor 10 outside the motor housing 20 for conjoint rotation. For illustrative purposes, merely the motor housing 20 and the fan impeller 30 can be seen in the perspective illustration of FIG. 1. In addition, cooling connectors 29a, 29b for feeding in and discharging cooling fluid for cooling the axial flux motor are shown. The cooling connectors 29a, 29b can comprise, for example, a cooling fluid inlet 29a and a cooling fluid outlet 29b. In addition, electric connectors of the axial flux motor 10 are shown.

The fan 1 according to the invention or its components is/are configured as a high-voltage fan 1. Here, in particular, the axial flux motor 10 can be designed as a high-voltage axial flux motor 10. This means that the axial flux motor 10 is dimensioned for applications in the high-voltage area in the case of operating voltages of up to 800 Volts or 850 Volts and more. The fan 1 can be used, in particular, to cool components of an electric vehicle (for example, a battery-operated electric vehicle, in particular a motor vehicle such as a passenger car or utility vehicle). As an alternative, the fan 1 can also be used in the case of further (mobile) applications, in the case of which a high (cooling) performance is required. These also include, in particular, applications with an electric motor and/or a combustion engine. For example, the fan 1 can be used in the case of applications with drive motors of similarly large dimensions such as an electric vehicle. Applications of this type can also comprise, for example, machines or vehicles with combustion engines and/or electric motors such as construction machines, generators or cranes, to mention only some examples.

Figure 2A:
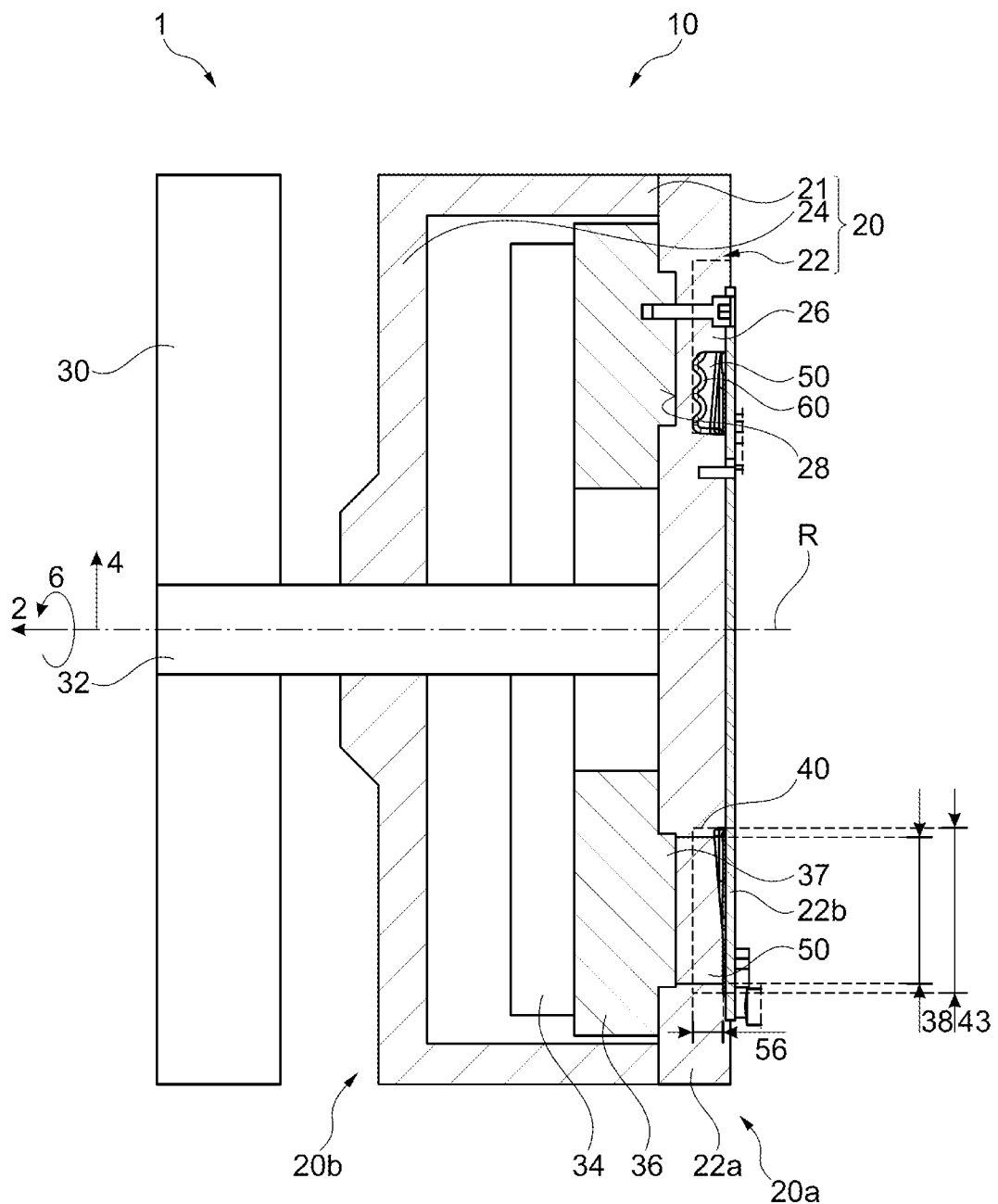
FIG. 2a shows a diagrammatic sectional illustration of the fan along the section A-A from FIG. 5b in one exemplary embodiment with only one stator.
Figure 2B:
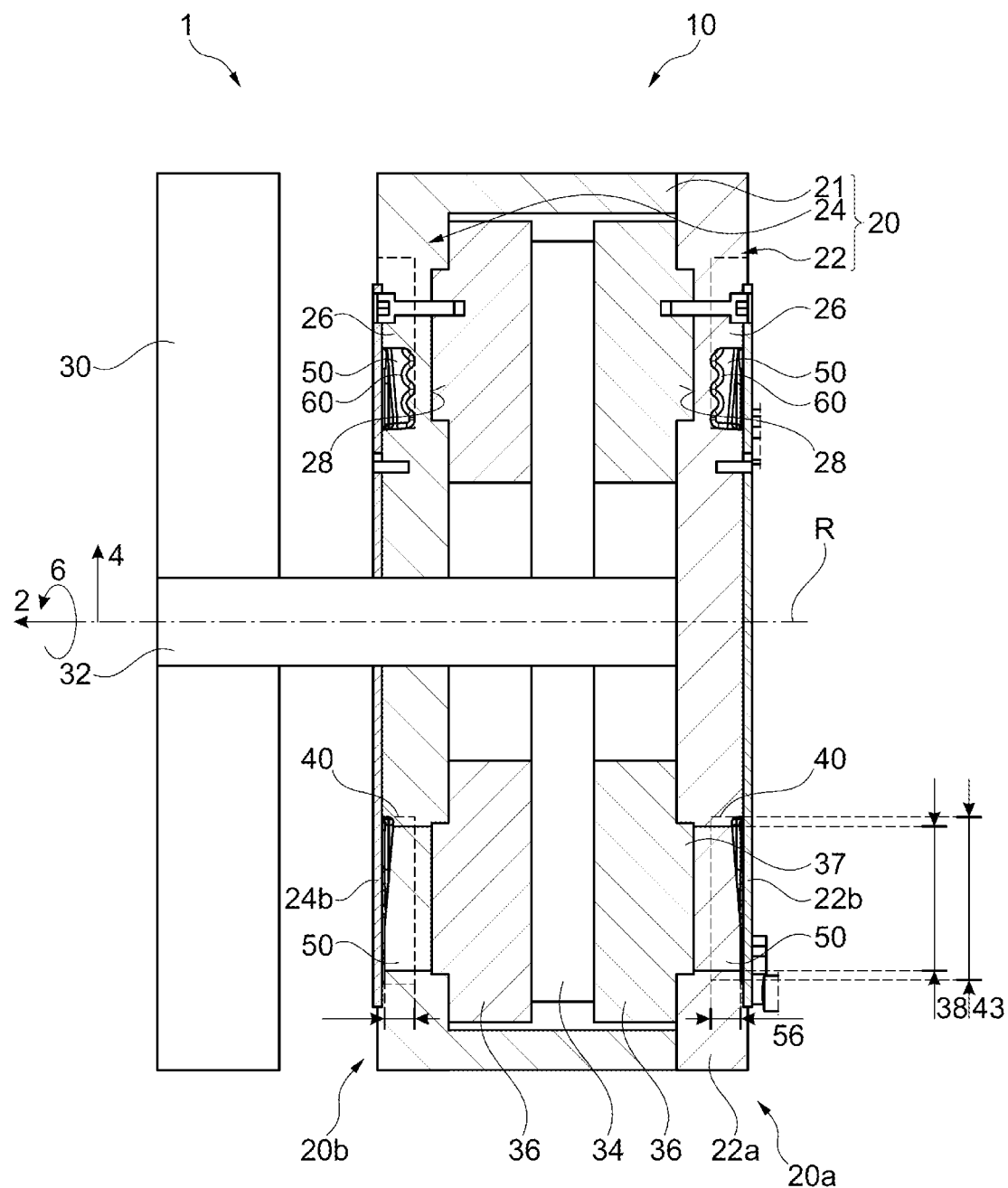
FIG. 2b shows the same diagrammatic sectional illustration of the fan as FIG. 2a in one exemplary embodiment with two stators.

FIG. 2a and FIG. 2b show the diagrammatic construction of the fan 1 in each case in a sectional illustration, from which the construction of a respective exemplary axial flux motor 10 and of an exemplary motor housing 20 according to the present invention is apparent. The exemplary embodiments differ in terms of the number of stators 36 and the number of housing portions 22, 24 with an integrated cooling channel 40. The details in respect of the individual components, in particular the cooling channel 40 or the housing portion 22, 24 which forms them, which will be described further below, can be applied in a similar or different way to the two embodiments or can be included in them, however.

In the embodiment according to FIG. 2a, the axial flux motor 10 comprises a motor housing 20, a shaft 32, a rotor 34 and a stator 36. The stator 36 is arranged axially adjacently with respect to the rotor 34 in the motor housing 20. In the second embodiment according to FIG. 2b, the axial flux motor 10 comprises a motor housing 20, a shaft 32, a rotor 34 and two stators 36. In this embodiment, the stators 36 are arranged axially adjacently in each case on one side of the rotor 34. In both cases, the shaft 32 is mounted rotationally in the motor housing 20, and the rotor 34 is arranged fixedly on the shaft 32 in the motor housing 20 for conjoint rotation. Therefore, the rotor 34 rotates together with the shaft 32 in the motor housing 20, the one or the two stators 36 driving the rotor 34. To this end, each of the stators 36 can comprise an annular stator yoke 37 with a plurality of stator teeth (not shown) which, distributed in the circumferential direction 6, extend from the stator yoke 37 in the axial direction 2 towards the rotor 34. The stators 36 or their stator teeth are wound around by electric lines (not shown), in order to form windings. The electric lines can have a round cross section or another cross section, such as a rectangular cross section, for example. The windings can comprise multi-layer windings. In the case of loading of the windings with a drive current, a magnetic field can be generated which is suitable for acting on the rotor 34 in order to drive the latter. The rotor 34 can comprise a plurality of permanent magnets (not shown). The permanent magnets can be arranged distributed in the circumferential direction 6. The permanent magnets can be configured in such a way that they in each case form at least one magnetic pole in the axial direction 2. Here, the permanent magnets can be configured to form in each case one-sided magnetic poles or two-sided magnetic poles. If, in particular, a stator 36 is arranged on both sides of the rotor 34, the permanent magnets can be configured to form two-sided magnetic poles, or permanent magnets can be provided for each rotor side, as is familiar to a person skilled in the art. There is an air gap (not shown) between the rotor 34 and the stator 36. This air gap extends in the axial direction 2 and can also be called an axial air gap.

Furthermore, in relation to FIG. 2a and FIG. 2b, the motor housing 20 according to the invention comprises a central housing 21 and at least one housing portion 22, 24. The shaft 32 with the rotor 34 is mounted and the stator 36 or the stators 36 is/are arranged in the central housing 21. The motor housing has a first axial end 20a and a second axial end 20b. The second axial end 20b is arranged so as to lie opposite the first axial end 20a. The central housing 21 has an axial housing opening at the first axial end 20a. The at least one housing portion 22, 24 comprises a first housing portion 22 and a second housing portion 24. The first housing portion 22 is arranged at the axial housing opening, in order to close the latter. In other words, the first housing portion 22 can serve as a housing cover. Here, the axial housing opening can be understood to be an opening for introducing the stators 36 and the rotor 34 with the shaft 32. As shown in FIG. 2a and FIG. 2b, the first housing portion 22 and the second housing portion 24 can be of substantially disc-shaped configuration. "Disc-shaped" can be understood in such a way that the housing portion 22, 24 has a thickness which is multiple times smaller than lateral dimensions with respect thereto (for example, orthogonally with respect to the thickness). According to the examples in FIG. 2a and FIG. 2b, a thickness of the housing portions 22, 24 is to be understood to mean a dimension in the axial direction 2. Disc-shaped can be, for example, substantially round. In this example, the radius can be multiple times greater than the axial thickness, for example by at least a factor of 2, 3, 4, 5 or more. As an alternative, disc-shaped can also comprise oval, rectangular or polygonal. In examples of this type, an extent in the radial direction 4 can be multiple times greater than the axial thickness, for example by at least a factor of 2, 3, 4, 5 or more.

In the exemplary embodiment of FIG. 2a, the second housing portion 24 is configured integrally with the central housing 21. In other words, the second wall portion 24 can be configured as an end wall 24 of the motor housing 20 or of the central housing 21. Here, the second wall portion 24 can comprise a passage for the shaft 32. The first housing portion 22 is of at least partially double-walled configuration, in order to configure an internal cooling channel 40 in the first housing portion 22. The interior of the motor housing 20, in which the rotor and stator are arranged, can be separated from the cooling as a result of the integration of the cooling into a double-walled housing portion 22, 24 of the motor housing 20. The stator 36 is arranged on the first housing portion 22. As a result, the stator 36 can be cooled efficiently. The first housing portion 22 comprises a first wall portion 22a and a second wall portion 22b. The cooling channel 40 is formed between the first wall portion 22a and the second wall portion 22b. More precisely, the cooling channel 40 can be formed in the axial direction 2 between surfaces, directed axially towards one another, of the first wall portion 22a and the second wall portion 22b. The first wall portion 22a of the first housing portion 22 serves here as a housing cover 22a for closing the axial opening of the motor housing 20. That is to say, the first housing portion 22 or its first wall portion 22a can serve as an end wall, in particular an axial end wall, of the motor housing 20. Stated in an alternative manner, the first housing portion 22 or its first wall portion 22a can serve as a first end wall, in particular a first axial end wall, of the motor housing 20. The second housing portion 24 can serve as a second end wall, in particular a second axial end wall, of the motor housing 20. The second wall portion 22b is configured as a cooling cover 22b for closing the cooling channel 40. Here, the cooling cover 22b can be fastened to the first wall portion 22a or can be fastened to the central housing 21. The contours of the cooling channel 40 are shown by way of a dashed line in FIG. 2a. Here, the cooling channel 40 is formed in the radial direction 4 between a radially inner channel wall 42 and a radially outer channel wall 44 (see also FIG. 3a). In the example of FIG. 2a, the radially inner channel wall 42 and the radially outer channel wall 44 are part walls of the first wall portion 22a. In other words, the first wall portion 22a comprises an annular depression which forms the cooling channel 40. The second wall portion 22b can be configured as a cooling cover 22b, in order to close this depression and in order, as a result, to form the cooling channel 40 together with the first wall portion 22a. In alternative embodiments, the radially inner channel wall 42 and/or the radially outer channel wall 44 might be part walls of the second wall portion 22b. The second wall portion 22b might also comprise an annular depression for forming the cooling channel 40. In embodiments, the two wall portions might also comprise a radially inner channel wall 42 and/or a radially outer channel wall 44, in order to together form the cooling channel 40. In preferred embodiments, however, the two channel walls 42, 44 are included in the first wall portion 22a. Manufacturing of the cooling channel geometry which is suitable for mass production can be provided in a simple and inexpensive way by way of the integration of the cooling channel 40 into the first housing portion 22 which acts as a housing cover 22a. In particular, the housing cover 22a can be produced by way of a die casting method, in particular a low-pressure die casting method, in order to form the cooling channel geometry. That is to say, the housing cover 22a or the first wall portion 22 can be correspondingly recessed and shaped by way of the production method, in order to substantially form the cooling channel 40 which is closed or covered by the second wall portion 22b. As has already been mentioned, a reversed embodiment would also be conceivable, for example that the cooling cover 22b is arranged towards the housing interior of the motor housing 20, and the housing cover 22a is arranged at the first axial end 20a. In alternative embodiments to FIG. 2a, the cooling channel 40 and/or the stator 36 and/or the axial housing opening can also be arranged, as an alternative or in addition, on the axially opposite side of the motor housing 20 (at the second axial end 20b). Accordingly, the first housing portion 22 and/or the second housing portion 24 might be of analogous configuration.

In the exemplary embodiment of FIG. 2b, the axial motor 20 comprises two stators 36, in particular a first stator 36 and a second stator 36. The first housing portion 22 is of identical configuration to the first housing portion 22, as shown in FIG. 2a, and comprises an internal cooling channel 40. In addition, the second housing portion 24 comprises an internal cooling channel 40 as described in relation to FIG. 2a. The first stator 36 is arranged on the first housing portion 22. The second stator 36 is arranged on the second housing portion 24. As a result, the two stators 36 can be cooled efficiently. The second housing portion 24 or its first wall portion 24a is manufactured in an integral manner with the central housing 21. Here, the second housing portion 24 or its first wall portion 24a can serve as an axial end wall of the central housing 21. Expressed in an alternative manner, the first housing portion 22 or its first wall portion 22a can serve as a first end wall, in particular a first axial end wall, of the motor housing 20. The second housing portion 24 or its first wall portion 24a can serve as a second end wall, in particular a second axial end wall, of the motor housing 20. Even if, in FIG. 2b, the second housing portion 24 or its first wall portion 24a is of integral configuration with the central housing 21, the central housing 21 might also have an axial housing opening at the second axial end 20b in alternative embodiments. This axial housing opening might likewise be configured for the introduction of the stator 36 or the stators 36 and/or the rotor 34 with the shaft 32. In embodiments of this type, the second housing portion 24 or its first wall portion 24a might serve in an analogous way as a housing cover 24a, in particular as a second housing cover 24a. Expressed in an alternative manner, in embodiments of this type, the second housing portion 24 or its first wall portion 24a can be configured as a component separately from the central housing 21 and can be fastened to the latter. In embodiments with two stators, the motor housing 20 or the central housing 21 might also have an axial housing opening only at the second axial end 20b. In embodiments with two stators 36, only one of the two housing portions 22, 24 might also comprise an internal cooling channel 40. For example, the first housing portion 22 might not comprise a cooling channel 40.

In addition to the embodiments shown in FIG. 2a and FIG. 2b, the axial flux motor 10 might also comprise at least two rotors 34 and/or at least two stators 36. For example, the axial flux motor 10 might comprise two rotors 34 with in each case one stator 36 or with two stators 36 which are arranged on both sides of the respective rotor 34. Here, one of the rotors 34 might also be assigned only one stator 36, and the other rotor 34 might be assigned two stators 36. In addition, it would be possible that the axial flux motor 10 comprises three, four or more rotors 34 with in each case one stator 36 and/or with two stators 36 which are arranged on both sides of the respective rotor 34. In these cases, the motor housing 20 might be configured as in FIG. 2a or FIG. 2b, and might be extended correspondingly in the axial direction 2. As an alternative, the rotors 34 and/or stators 36 might be of axially narrower configuration. In embodiments with at least two rotors 34 and/or at least two stators 36, however, the motor housing 20 might also comprise further housing portions with or without integrated cooling channels. If the further housing portions comprise integrated cooling channels, the internal cooling channel can be, in particular, fluidically separated from the housing interior (for example, rotor, stator) here. For example, a housing portion might be arranged adjacently with respect to a stator. A housing portion might also be arranged between in each case two additional stators, however. In the case of a further housing portion, it might be arranged between the first housing portion 22 and the second housing portion 24. In embodiments with four or more stators, in particular, the further housing portion might be arranged between the additional (in comparison to FIG. 2b) two stators, in particular internal stators. Internal stators can be understood to be stators which are not arranged like the stators 36 from FIG. 2b at axial ends 20a, 20b of the motor housing 20. The further housing portion might be arranged in the central housing 21. As an alternative, the central housing 21 might be split, it being possible for the further housing portion to be arranged axially between the parts of the central housing 21. The further housing portion or at least its first wall portion might be of integral configuration with the central housing or one of its parts. The first wall portion of the further housing part might also be configured with one part of the central housing, and the second wall portion of the further housing part might be configured with another part of the central housing. The at least one further housing portion can comprise at least one internal cooling channel 40 as described herein. In particular, one or two further stators can be arranged on the further housing portion. This serves firstly to secure/orient the further stators. Secondly, if the further housing portion comprises an internal cooling channel, the further stators can be cooled efficiently. The details in respect of the individual components, in particular the cooling channel 40 or the housing portion 22, 24 which forms them, which are described further below, might be applied in an identical or different way to these further embodiments or might be included in them.

In the following text, further details of the cooling channel 40 and the housing portion 22, 24 which forms it and details in respect of the relative arrangement of the stators 36 with regard to the motor housing 20 will be explained. Even if only individual elements are addressed in part, individual, a plurality of or all the features which relate to said elements can be transferred to identical elements in an analogous way. For example, features relating to the cooling channel 40 can be explained on the basis of a figure. Here, the explained features or else only part of the explained features can be applied to further cooling channels 40. If a plurality of cooling channels 40 and housing portions 22, 24 which form them are included in embodiments, they can be of identical or different configuration, and can comprise individual, a plurality of or all the features which describe said elements. In the following text, further details of the housing portion and the cooling channel and their arrangement will be described, it being possible for individual, a plurality of or all the features to be applied to individual, a plurality of or all the housing portions.

Figure 5A:
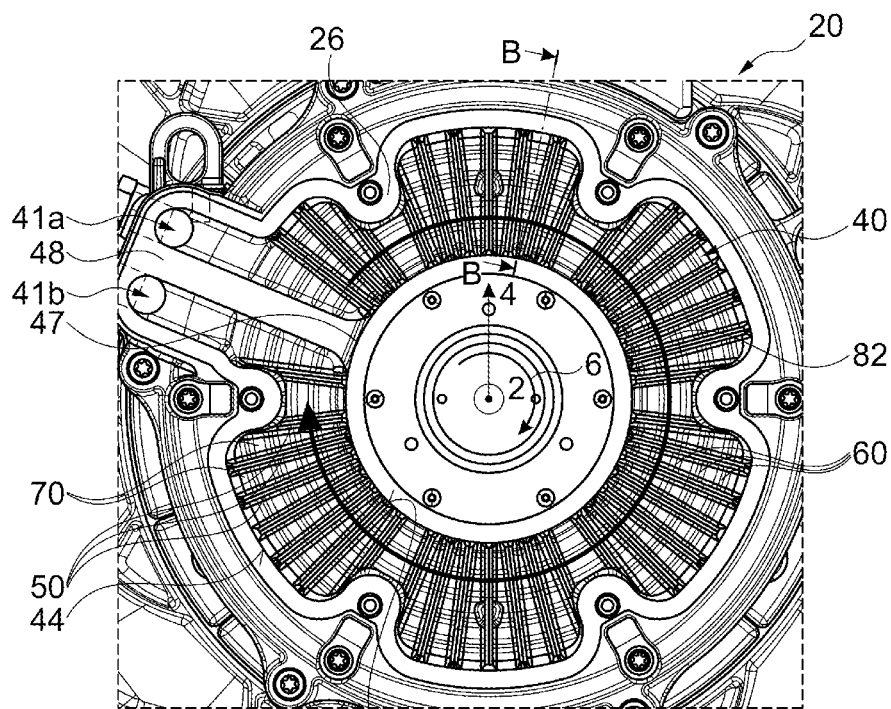
FIG. 5a shows a front view of the motor housing according to the invention for the axial flux motor with a visible cooling channel without a cooling channel cover, and a diagrammatically illustrated first cooling flow.
Figure 5B:
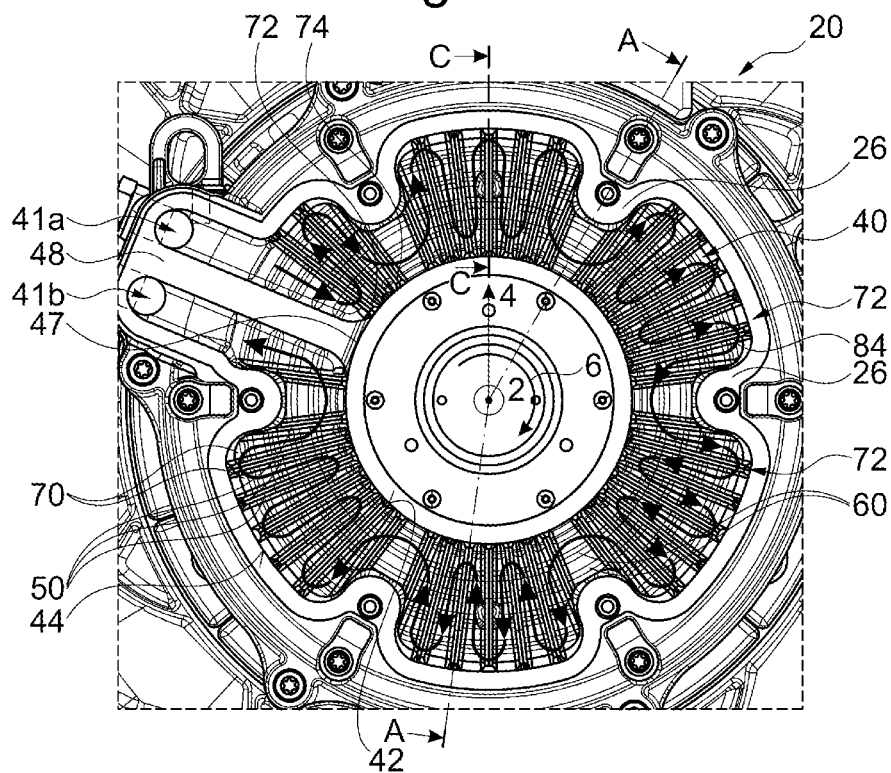
FIG. 5b shows a front view of the motor housing according to the invention for the axial flux motor with a visible cooling channel without a cooling channel cover, and a diagrammatically illustrated second cooling flow.

The cooling channel 40 extends in a substantially annular manner in the circumferential direction 6 between an inlet 41a and an outlet 41b (see also FIG. 5a and FIG. 5b). As a result, a first cooling flow 82 can be produced during operation, which first cooling flow 82 flows substantially in the circumferential direction 6 through the cooling channel 40. The first cooling flow 82 is indicated diagrammatically by way of an arrow in the circumferential direction 6 in FIG. 5a. In alternative embodiments, the cooling channel 40 can also be configured in such a way that a first cooling flow 82 is produced which flows counter to the clockwise direction with respect to the flow direction which is shown in FIG. 5a. Here, the cooling channel 40 is of fluidically separated configuration with respect to the housing interior of the motor housing 20. The first cooling flow 82 can be understood to be a part volumetric flow of a cooling fluid which is conducted through the cooling channel 40. The cooling fluid can be, for example, a glycol/water mixture, for example in the ratio 50/50%. Other mixing ratios or cooling fluids which are familiar to a person skilled in the art can also be used. In particular, the housing portion can comprise an aluminium material. A volumetric flow of the cooling fluid between the inlet 41a and the outlet 41b can be, for example, approximately 10 l/min or from 5 l/min to 15 l/min. A pressure difference between the inlet 41a and the outlet 41b can be, for example, 10 kPa.

As can be seen from FIG. 5a, the cooling channel 40 can extend in a substantially annular manner in the circumferential direction 6 over a region of approximately 360°. In alternative embodiments, however, the cooling channel 40 can also extend over a region of less than 360°. For example, the cooling channel 40 can extend in a substantially annular manner in the circumferential direction 6 over a region of from approximately 30° to approximately 360°. Annular can be understood to mean, in particular, annular section-shaped, and can extend only over a circular segment which comprises less than 360°. By way of the first cooling flow 82 which is made possible in the circumferential direction 6, pressure losses can be reduced, for example, in comparison with a pure labyrinthine flow.

In embodiments, a plurality of internal cooling channels 40 (not shown) can also be configured in a housing portion 22, 24. The plurality of internal cooling channels 40 can be arranged adjacently in the circumferential direction 6. In embodiments with a plurality of internal cooling channels 40, the plurality of internal cooling channels 40 can also be arranged in an overlapping manner in the radial direction 4. For example, the cooling channels 40 can be arranged at different radial positions. As an alternative or in addition, the plurality of internal cooling channels 40 can in each case have a dedicated inlet 41a and/or outlet 41b. In embodiments with a plurality of cooling channels 40, two cooling channels 40 can extend, for example, in the circumferential direction 6 in each case by approximately 180° or less. For example, the cooling channels 40 can extend in opposite or identical circumferential directions 6 between the inlet 41a and the outlet 41b. Expressed in an alternative manner, the cooling channels 40 can extend in or counter to the clockwise direction in FIG. 5a. In the case of a plurality of cooling channels, the inlets 41a and outlets 41b can have a common cooling fluid feed and cooling fluid discharge, respectively, and/or can have a separate cooling fluid feed and cooling fluid discharge, respectively. The inlets can be arranged adjacently with respect to one another. The outlets can be arranged adjacently with respect to one another. As an alternative, a respective inlet can also be arranged adjacently with respect to a respective outlet. The inlets and/or outlets can in each case be fluidically separated or fluidically connected. As an alternative, an inlet can also in each case be arranged adjacently in a fluidically separated/connected manner with an outlet of the adjacent cooling channel. An improved cooling effect can be provided by way of a plurality of internal cooling channels 40 in a housing part 22, 24.

As has already been mentioned, the cooling channel 40 is formed between the first wall portion 22a and the second wall portion 22b. More precisely, the cooling channel 40 is formed in the axial direction 2 between surfaces, directed axially towards one another, of the first wall portion 22a and the second wall portion 22b. Worded in an alternative manner, the cooling channel 40 can be delimited in the axial direction 2 by way of the first wall portion 22a and the second wall portion 22b, in particular by way of their surfaces which are directed towards one another. Between the first wall portion 22a and the second wall portion 22b, the cooling channel 40 has a channel height 46 in the axial direction 2 (see, in particular, FIG. 6a and FIG. 6b). More precisely, the cooling channel 40 has a channel height 46 in the axial direction 2 between surfaces, directed axially towards one another, of the first wall portion 22a and the second wall portion 22b. Worded in an alternative manner, the cooling channel 40 extends in the axial direction 2 over a channel height 46 between surfaces, directed axially towards one another, of the first wall portion 22a and the second wall portion 22b. The channel height 46 can also be called an axial channel height 46. In the radial direction 4, the cooling channel 40 is formed between the radially inner channel wall 42 and the radially outer channel wall 44. Worded in an alternative manner, the cooling channel 40 can be delimited in the radial direction 4 by way of the radially inner channel wall 42 and by way of the radially outer channel wall 44. In other words, the cooling channel 40 is configured in the radial direction 4 between the radially inner channel wall 42 and the radially outer channel wall 44. The cooling channel 40 has a channel width 43 in the radial direction 4 between the radially inner channel wall 42 and the radially outer channel wall 44 (see FIG. 2a and FIG. 2b). The channel width 43 can also be called a radial channel width 43.

As can be gathered from FIG. 2a and FIG. 2b, the stator 36 is arranged on the first housing portion 22 or the second housing portion 24. In addition, the respective housing portion 22, 24 in the illustrated embodiments comprises a depression 28 for arranging the stator 36. The depression 28 can also be called a stator depression 28. As a result of the stator depression, the stator can be arranged closer to the cooling channel 40, as a result of which a cooling effect can be improved. In addition to the improved cooling effect, simplified centring of the stator 36 can additionally be made possible. The stator 36 or at least its stator yoke 37 can be arranged at least partially in the depression 28. Expressed in an alternative manner, the stator 36 and/or its stator yoke 37 can protrude out of the depression 28. The depression 28 can be of annular configuration. In particular, the depression 28 can be arranged concentrically with respect to the cooling channel 40 or with respect to the axis of rotation R. As shown in FIG. 2a and FIG. 2b, the depression 28 can be arranged in the first wall portion 22a, 24a. Here, the depression 28 is arranged on a side of the first wall portion 22a, 24a, which side lies opposite the cooling channel 40. In advantageous embodiments, the cooling channel 40 can be arranged and configured in such a way that it overlaps the depression 28 in the radial direction 4. In other words, the channel width 43 can be greater than a radial width of the stator depression 28 (see, in particular, FIG. 2a and FIG. 2b). In other words, the channel width 43 of the cooling channel 40 in the radial extent is greater than a radial width of the cut-out 28 or the stator 36 or at least its stator yoke 37, in particular in the region of the cut-out 28. In particular, at least the stator yoke 37 of the stator 36 can be overlapped in the radial direction 4 by way of the cooling channel 40. Worded in an alternative manner, a yoke width 38 of the stator yoke can be smaller than the channel width 43 of the cooling channel 40. In the embodiments which are shown, the cooling channel 40 overlaps the stator 36 or at least its stator yoke 37 on both sides in the radial direction 4. In embodiments, the radial overlap can also be only on one side. The cooling channel 40 or the depression 28 can also be configured in such a way that the cooling channel 40 does not extend radially beyond the depression 28. A cooling effect can be improved further by way of the overlap.

In the exemplary embodiments which are shown, the stator 36 is fastened to the housing portion 22, 24 via a plurality of screw connections. The fastening of the stator via screw connections can, as can be gathered, in particular, from FIG. 5a and FIG. 5b, take place by way of a plurality of fastening indentations 26. To this end, the housing portion 22, 24 can have a plurality of fastening indentations 26 which are arranged distributed in the circumferential direction 6. Here, the radially outer channel wall 44 is offset inwards in the radial direction 4 in a respective region of the fastening indentations 26. Worded in an alternative manner, the radially outer channel wall 44 protrudes radially inwards at positions distributed in the circumferential direction 6, in order to form the fastening indentations 26. In alternative embodiments, individual or all fastening indentations 26 can also be arranged on the radially inner channel wall 42 or can be arranged in the form of an island in the cooling channel 40. The fastening indentations serve to attach a stator 36 to the respective housing portion 22, 24. The fastening indentations 26 can be configured, for example, as a screw flange, in order to screw the stator 36 fixedly to the housing portion 22, 24.

As shown in FIG. 5a and FIG. 5b, six screw connections or fastening indentations 26 can be provided, for example. The fastening indentations 26 or the screw connections can be arranged, in particular, in the region of the stator depression 28 of the housing portion 22, 24 or in the region of the stator teeth of the stator 36. In particular, the screw connections or their threaded holes can extend at least partially into the stator teeth. As a result, a simpler and, in particular, more compact screw connection is possible. In addition, in the case of an at least partial extent of the screw connections into the stator teeth, reliable fastening can be provided. In alternative embodiments, the stator 36 can also be fastened to the housing portion 22, 24 via fewer than or more than six screw connections and/or fastening indentations 26. For example, two, three or more fastening indentations 26 and/or screw connections can be configured. The fastening indentations 26 and/or screw connections can be arranged distributed circumferentially at uniform intervals. In addition or as an alternative to the screw connections, other fastening means, in particular non-positive, positively locking and/or integrally joined fastening means with or without fastening indentations 26, can also be provided. The radially inner channel wall 42 can be of annular, in particular circular configuration. As an alternative or in addition, the radially inner channel wall 42 can have an undulating or smooth course. In an analogous way, the radially outer channel wall 44 can be configured to be annular, in particular circular and/or with an undulating or smooth course.

Figure 3A:
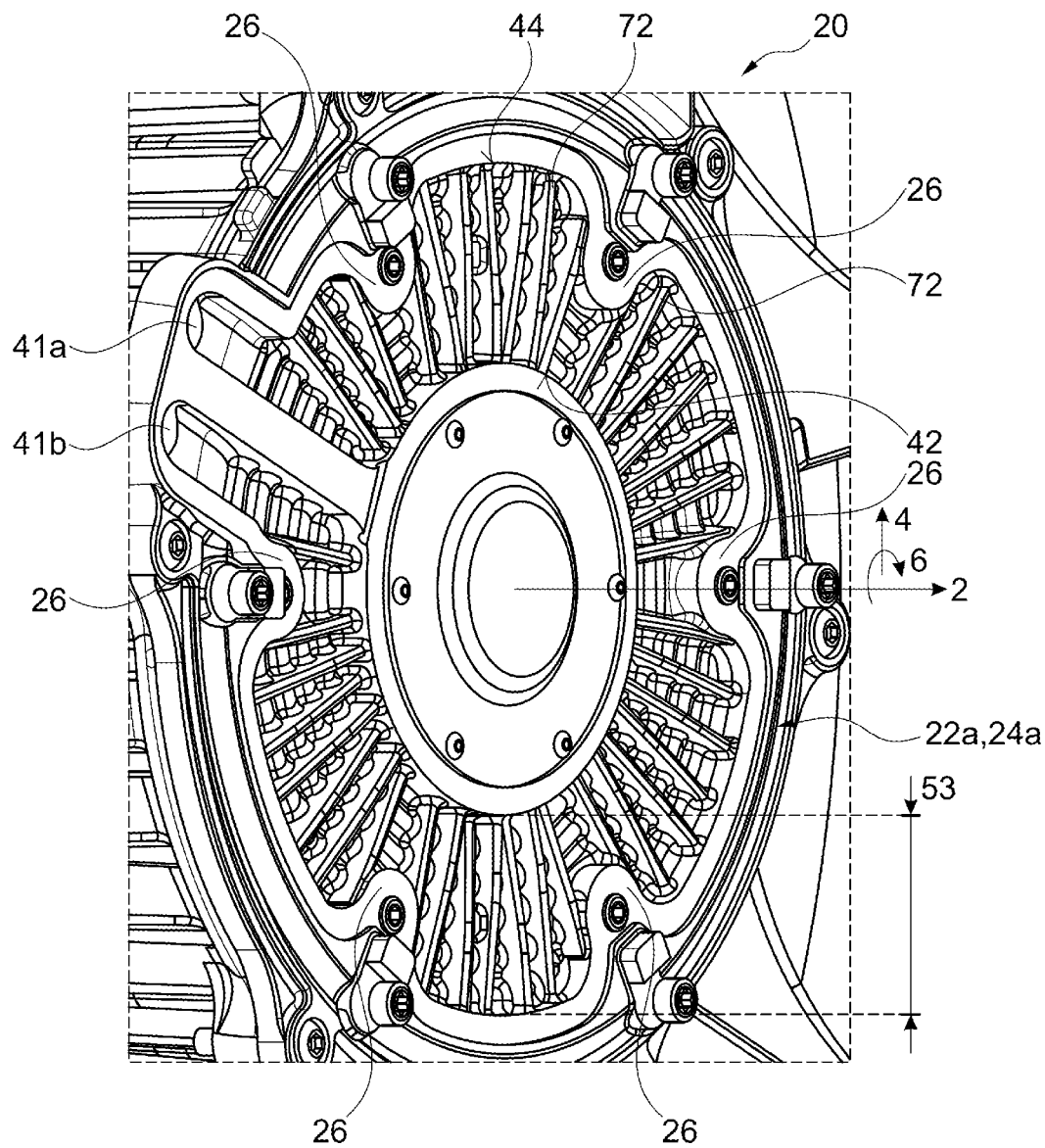
FIG. 3a shows a perspective illustration of the motor housing according to the invention for the axial flux motor with a visible cooling channel without a cooling channel cover.
Figure 4:
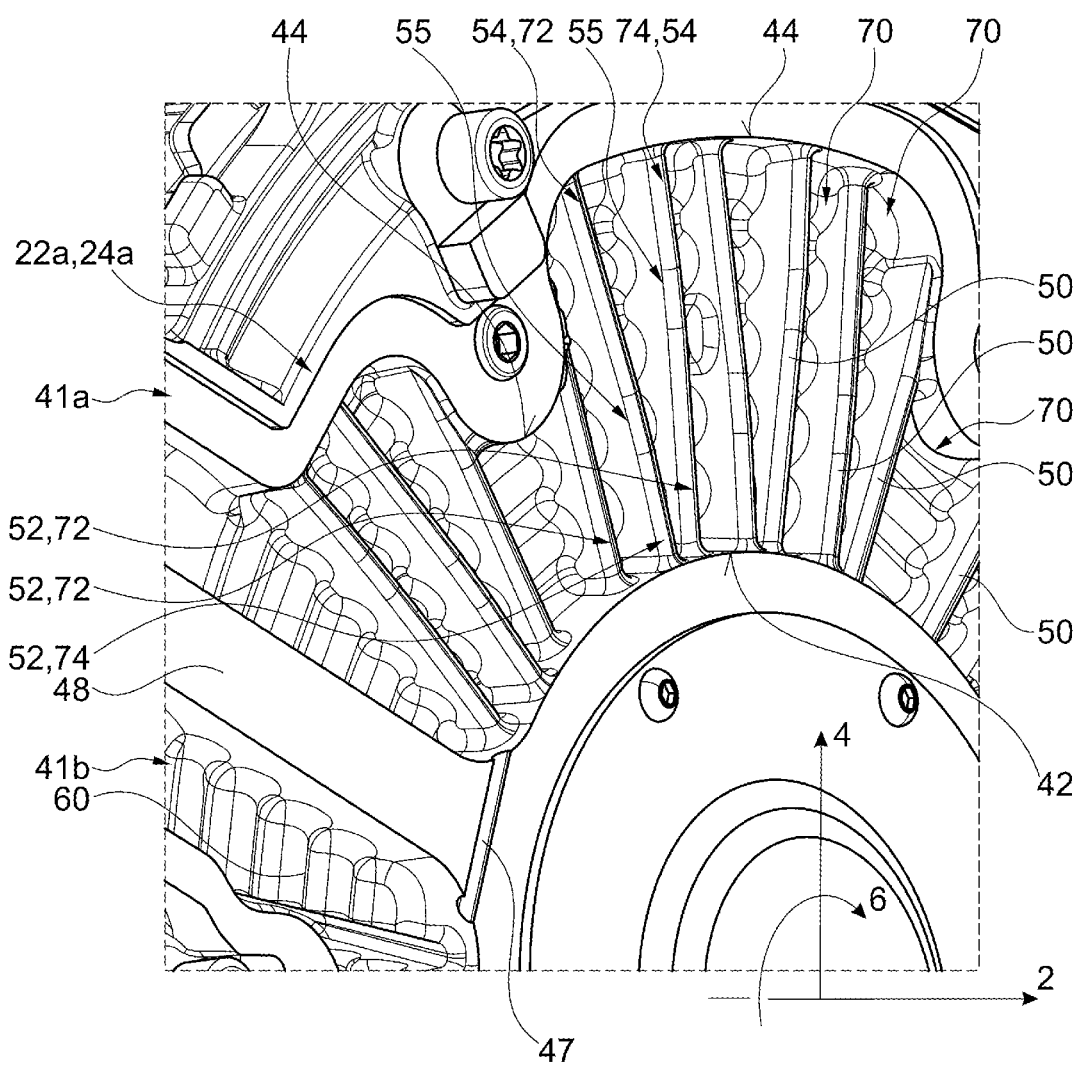
FIG. 4 shows a perspective detailed view from FIG. 3a, on the basis of which an exemplary cooling channel geometry of the motor housing according to the invention is explained.

As can be gathered, in particular, from FIG. 3a and FIG. 4, the cooling channel 40 comprises a plurality of transverse ribs 50. The transverse ribs 50 are arranged spaced apart in the circumferential direction 6. A rib intermediate region 70 is configured in each case between two adjacent transverse ribs 50. The dissipation of heat can firstly be increased by way of the transverse ribs 50, by way of an increase in the surface area of the cooling channel 40. Furthermore, the transverse ribs 50 have a reinforcing effect on the motor housing 20 and therefore make it more robust, which is advantageous, in particular, during use in a mobile application such as a motor vehicle. The combined production of the first cooling flow 82 in combination with an increased dissipation of heat by way of the increased surface area of the cooling channel 40 and turbulence on one or two adjacent transverse ribs 50 are particularly advantageous. Therefore, an axial flux motor 10 with an improved powerful, compact heat dissipation means can be provided, by the motor housing 20 being configured with transverse ribs. By way of the integration of the cooling into the double-walled housing portion 22, 24 of the motor housing 20, the interior of the motor housing 20, in which the rotor and stator are arranged, can be separated from the cooling.

In the following text, features of the transverse ribs 50 which can be applied to individual, a plurality of or all the transverse ribs 50 will be explained.

The transverse ribs can be understood to be rib-like elements which extend in a lateral direction, that is to say transversely with respect to the first cooling flow 82 or with respect to the circumferential direction 6. The transverse ribs 50 extend along a rib width 53 laterally with respect to the circumferential direction 6 (see FIG. 3a). Expressed in an alternative manner, the transverse ribs 50 extend in a first lateral direction. The first lateral direction can be substantially orthogonal with respect to the circumferential direction 6 and can define the rib width 53. In particular, the transverse ribs 50 extend along the rib width 53 in a substantially radial direction 4. In other words, the transverse ribs can extend laterally in a substantially radial direction or can extend laterally with respect to the circumferential direction in a substantially radial direction. The extent of the transverse ribs 50 "in a substantially radial direction 4" can be understood in such a way that the transverse ribs 50 can extend in a manner which is inclined in a range of ±15° or in a range of ±10° with respect to an exactly radial direction 4. In particular, "extent of the transverse ribs 50 in a substantially radial direction 4" can be understood in such a way that the transverse ribs 50 can extend in a manner which is inclined in a range of ±5° with respect to an exactly radial direction 4. Here, the inclination can be in the axial direction 2 and/or in the circumferential direction 6. In particular, one or a plurality of or all the transverse ribs can extend in an exactly radial direction 4 or in a range of ±2° with respect thereto. The term "±" is to be understood here in the sense of "in" or "counter" to the clockwise direction. The transverse ribs 50 can also be called radial ribs 50 on account of their substantially radial extent. Turbulence and, as a result, improved thorough mixing of the cooling fluid which flows through the cooling channel 40 can be achieved by way of the extent of the transverse ribs 50 laterally with respect to the circumferential direction 6.

In addition, the transverse ribs 50 extend along their rib width 53 completely from the radially inner channel wall 42 as far as the radially outer channel wall 44. In other words, the transverse ribs 50 extend over the entire channel width 43 of the cooling channel 40. In other words, the channel width 43 corresponds to the rib width 53. In alternative embodiments, individual, a plurality of or all the transverse ribs 50 can extend only at least partially between the radially inner channel wall 42 and the radially outer channel wall 44. "Extend at least partially" can be understood in such a way that the transverse ribs 50 are spaced apart from the radially inner channel wall 42 or radially outer channel wall 44, for example, in a region along their radial rib width 53, in particular in a radially inner region or in a radially outer region.

Figure 6A:
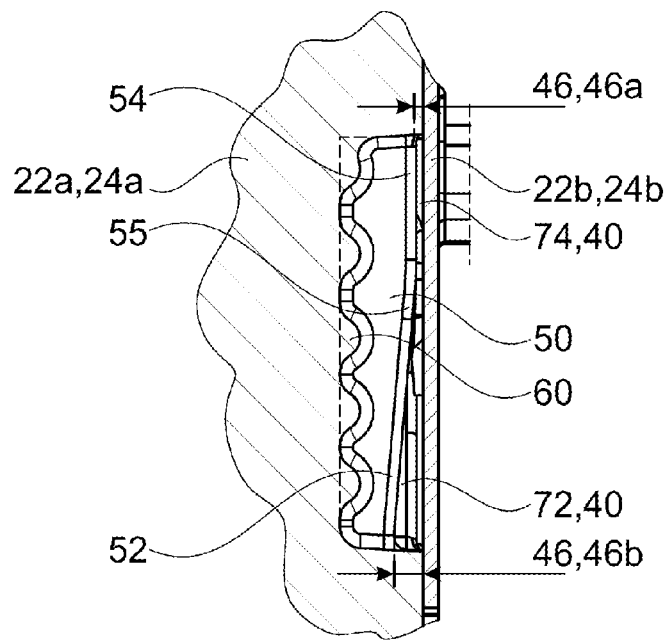
FIG. 6a shows a partial sectional view of the motor housing along the section B-B from FIG. 5a with a partially diagrammatically shown cooling channel and a visible flow guiding arrangement, and a transverse rib.
Figure 6B:
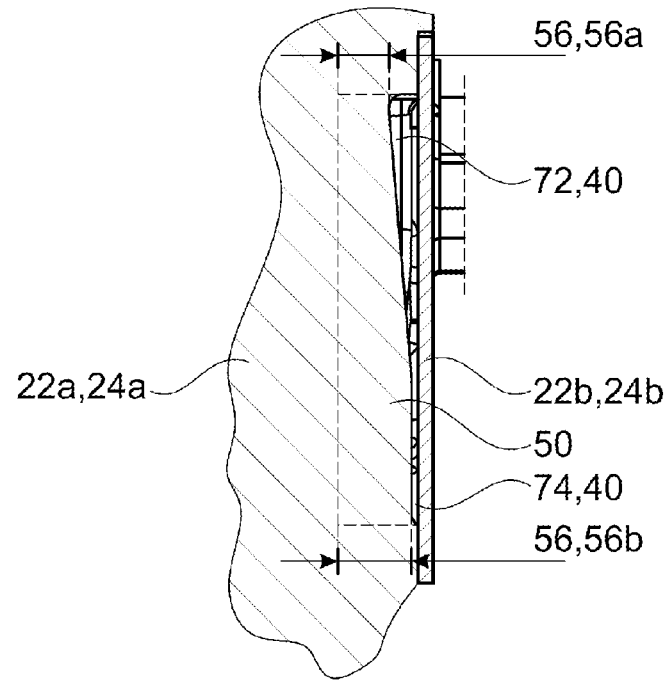
FIG. 6b shows a partial sectional view of the motor housing along the section C-C from FIG. 5b with a partially diagrammatically shown cooling channel and a visible transverse rib.

Along their rib width 53, the transverse ribs 50 have a radially inner rib portion 52, a radially outer rib portion 54 and a middle rib portion 55 which lies in between (see, in particular, FIG. 4, FIG. 6a and FIG. 6b). The transverse ribs 50 extend along a rib height 56 in the axial direction 2. "Rib height 56" is to be understood, in particular, to mean orthogonally with respect to the rib width 53. Here, the transverse ribs 50 can have different axial extents, that is to say rib heights 56, as viewed over the rib width 53. In other words, at least some of the transverse ribs 50 can have a non-constant rib height 56. For example, the rib height 56 can vary between a first, in particular minimum, rib height 56a and a second, in particular maximum, rib height 56b. An axial extent to a different degree of the transverse ribs 50 can achieve preferred flow guidance of cooling fluids. In particular, a part flow in the circumferential direction 6, for example from one rib intermediate region 70 to an adjacent rib intermediate region 70, can be preferred in the region of a smaller axial extent. A more pronounced flow in the lateral direction, in particular in the radial direction 4 along the rib width 53 or in a rib intermediate region 70, can be achieved in the region of a greater axial extent. A channel height 43 in a rib intermediate region 70 can be, in particular, greater than in the region of the transverse ribs 50.

In accordance with the exemplary embodiments in the figures, the transverse ribs 50 are arranged on the first wall portion 22a, 24a (see, in particular, FIG. 3a, FIG. 4, FIG. 6a and FIG. 6b). Here, the transverse ribs 50 protrude from the first wall portion 22a, 24a in the axial direction 2 along their rib height 56 into the cooling channel 40. In other words, starting from the first wall portion 22a, 24a, the transverse ribs 50 rise into the cooling channel 40. The channel height 46 of the cooling channel 40 can be reduced in the region of a respective transverse rib 50 by way of the axial extent of the transverse ribs 50 into the cooling channel 40. In this context, "reduced" can be understood in comparison with regions of the cooling channel 40, in which no transverse ribs 50 are arranged. In particular, at least some of the transverse ribs 50 can protrude to a different extent in the axial direction 2 into the cooling channel 40 as viewed over their rib width 53, with the result that the cooling channel 40 has different channel heights 46 as viewed over the respective rib width 53. For example, the channel heights 46 can vary between a first, in particular minimum, channel height 46a and a second, in particular maximum, channel height (see FIG. 6b). By way of the reduction of the channel height 56, a nozzle effect can be achieved in the region of the respective transverse rib 50, and an expansion can be achieved downstream of the respective transverse rib 50 in the flow direction, which expansion leads to turbulence. In alternative embodiments, the transverse ribs 50 can be arranged on the first wall portion 22a, 24a and/or the second wall portion 22b, 24b. In particular, at least some of or all the transverse ribs 50 can be arranged on the second wall portion 22b, 24b (not depicted). In embodiments, at least some transverse ribs 50 can be arranged on one of the first wall portion 22a, 24a and the second wall portion 22b, 24b, it being possible for at least one transverse rib 50, in particular the remaining ones of the plurality of transverse ribs 50, to be arranged on the other one of the first wall portion 22a, 24a and the second wall portion 22b, 24b. In embodiments, the transverse ribs 50 can be arranged in an alternating manner or in a certain sequence on the first wall portion 22a, 24a and the second wall portion 22b, 24b. For example, two transverse ribs 50 can be arranged on the first wall portion 22a, 24a and two transverse ribs 50 can be arranged on the second wall portion 22b, 24b in an alternating manner. For example, a certain first number of transverse ribs 50 can be arranged on the first wall portion 22a, 24a and a certain second number of transverse ribs can be arranged on the second wall portion 22b, 24b in an alternating manner. The certain first number and the certain second number can be identical or different, or can be variable in the case of an arrangement change. For example, the certain first number and the certain second number can comprise one, two, three, four, five, six, seven, eight, nine or ten or more transverse ribs 50, in particular from one to five. Intermediate values and/or ranges are also possible.

As can be gathered, in particular, from FIG. 6a and FIG. 6b, the transverse ribs 50 protrude from the first wall portion 22a, 24a in the axial direction 2 only to such an extent towards the second wall portion 22b, 24b into the cooling channel 40 that they are still spaced apart from the second wall portion 22b, 24b. As a result, at least a minimum axial channel height 46a of the cooling channel 40 can be ensured in the region of a respective transverse rib 50. In particular, transverse ribs 50 protrude over their entire rib width 53 in the axial direction 2 only to such an extent into the cooling channel 40 that a channel height 46 of the cooling channel 40 over the entire rib width 53 is at least greater than 0.0 mm. Expressed in an alternative manner, the transverse ribs 50 are spaced apart axially from the opposite wall portion 22b, 24b of the cooling channel 40. In particular, the transverse ribs 50 are spaced apart from the opposite wall portion 22b, 24b of the cooling channel 40 in the radially inner rib portion 52, the middle rib portion 55 and a radially outer rib portion 54. As a result, the first cooling flow 82 can remain enabled in the circumferential direction 6 over the entire rib width 43. In particular, the channel height 46 of the cooling channel 40 can be at least 0.5 mm, preferably at least 1.0 mm and particularly preferably at least 1.5 mm over the entire rib width. In embodiments, the channel height 46 of the cooling channel 40 over the entire rib width can be between 0.5 mm and 2.5 mm. In advantageous embodiments, the channel height 46 of the cooling channel 40 over the entire rib width can be, for example, 1.0 mm±0.5 mm, or 1.5 mm±0.5 mm. In these particularly advantageous embodiments, a circumferential flow can be made possible and, at the same time, a pressure loss can be kept low. In alternative embodiments, the transverse ribs 50 can protrude over a large part of their rib width 53 from the first wall portion 22a, 24a in the axial direction 2 only to such an extent towards the second wall portion 22b, 24b into the cooling channel 40 that they are still spaced apart from the second wall portion 22b, 24b over a large part of their rib width 53. Expressed in an alternative manner, the transverse ribs 50 can protrude in the axial direction 2 only to such an extent into the cooling channel 40 that a channel height 46 of the cooling channel 40 over a large part of the rib width 53 is at least greater than 0.0 mm. A large part can comprise, in particular, at least 50%, at least 60%, at least 70%, at least 80%, at least 90% or at least 95% of the entire rib width 53. The features described herein for spacing apart the transverse ribs 50 can also be applied in an analogous way to transverse ribs 50 which are arranged on the second wall portion 22b, 24b.

With reference to FIG. 4 and FIG. 6b, it becomes clear that the transverse ribs 50 are configured and protrude into the cooling channel 40 in such a way as, during operation, to produce a second cooling flow 84 which flows through the cooling channel 40 in a laterally meandering manner with respect to the first cooling flow 82. In particular, the transverse ribs are configured in such a way that the second cooling flow 84 is produced and at the same time the first cooling flow 82 remains enabled. This can be implemented, in particular, by way of spacing apart from the opposite channel wall 22b, 24b. In particular, radially inner and outer edge regions and corners of the cooling channel 40 can be flushed in an improved manner by way of the meandering second cooling flow 84 which is produced. In addition, the turbulence and, as a result, the possible dissipation of heat are increased by way of the meandering course. The combined production of the first cooling flow 82 and the second cooling flow 84 which, during operation, interact with one another and can therefore lead to desired turbulent flow regions and, as a result, to an efficient heat exchange in the cooling channel 40 is particularly advantageous. By way of the transverse ribs 50, the second cooling flow 84 can be produced and can be guided on the transverse ribs 84 in the rib intermediate regions 70 along the rib width 53.

In particular, the transverse ribs 50 protrude along their rib height 56 in the axial direction 2 into the cooling channel 40 in such a way that, during operation, the second cooling flow 84 flows through the cooling channel 40 in a laterally meandering manner between a radially inner region of the cooling channel 40 and a radially outer region of the cooling channel 40. More precisely, the transverse ribs 50 protrude along their rib height 56 in the axial direction 2 into the cooling channel 40 in such a way that, during operation, the second cooling flow 84 flows through the cooling channel 40 in a laterally meandering manner between the radially inner channel wall 42 and the radially outer channel wall 44. Expressed in an alternative manner, the second cooling flow meanders radially inwards and outwards.

In order to produce the second cooling flow, the transverse ribs 50 protrude in one of a radially inner rib portion 52 or a radially outer rib portion 54 to a lesser extent in the axial direction 2 into the cooling channel 40 than in the respective other rib portion 52, 54 (see, in particular, FIG. 4, FIG. 6a and FIG. 6b). As a result, an increased rib passage 72 is formed in the region of the rib portion 52, 54 which extends to a lesser extent in the axial direction 2 into the cooling channel 40. In the example of the transverse rib 50 which is shown in FIG. 6a, this has an increased rib passage 72 in its radially inner rib portion 52. The increased rib passage 72 can be understood to be a type of window or cut-out which makes an increased cooling flow in the circumferential direction 6 possible. A channel height 46 of the cooling channel 40 in a region of the increased rib passage 72 can be greater, in particular, than in a region of the respective other rib portion 52, 54. As a result of the increased rib passage 72, cooling fluids, in particular the second cooling flow 84, can flow from one rib intermediate region 70 into an adjacent rib intermediate region 70. In other words, flow guidance of cooling fluids can be achieved by way of the provision of an increased rib passage 72. In particular, a part flow can be guided in the circumferential direction, for example from one rib intermediate region 70 to an adjacent rib intermediate region 70, in the region of an increased rib passage 72. In the respective other rib portion 52, 54, the transverse ribs 50 can extend in the axial direction 2 further into the cooling channel, in order to form a reduced rib passage 74. In the example of the transverse rib 50 which is shown in FIG. 6a, it has a reduced rib passage 74 in its radially outer rib portion 54. The reduced rib passage 74 makes the first cooling flow 82 possible, by way of which cooling fluids can flow through the cooling channel 40 in the circumferential direction 6 "above" the transverse ribs 50. In addition, a type of partial blockage or resistance can be achieved by way of the reduced rib passage 74, by way of which a part of the cooling fluid flow can be guided laterally, in particular along the second cooling flow 84. The term "reduced rib passage" clarifies that a smaller volumetric flow can flow in the circumferential direction 6 in comparison with the increased rib passage. Worded in an alternative manner, a channel height 46 of the cooling channel 40 is smaller in a region of the reduced rib passage 74 than in a region of the increased rib passage 72. Conversely, a channel height 46 of the cooling channel 40 is greater in a region of the increased rib passage 72 than in a region of the reduced rib passage 74. With regard to this, FIG. 6a shows a minimum channel height 46a in the region of the reduced rib passage 74. The cooling channel has an increased channel height 46b in the region of the increased rib passage 72. The part term "passage" of the reduced rib passage 74 clarifies that there is fundamentally a fluidic connection.

The channel height 46 of the cooling channel 40 in a region of the increased rib passage 72 is particularly preferably at least 3.0 mm. In alternative embodiments, a channel height 46 of the cooling channel 40 in a region of the increased rib passage 72 can be at least 1.0 mm and preferably at least 2.0 mm. In embodiments, a channel height 46 of the cooling channel 40 in a region of the increased rib passage 72 can be between 1.0 mm and 10.0 mm, preferably between 2.0 mm and 8.0 mm, or between 3.0 mm and 6.0 mm. In particularly advantageous embodiments, a channel height 46 of the cooling channel 40 in a region of the increased rib passage 72 can be, for example, 4.0 mm±0.5 mm, or 5.0 mm±0.5 mm. Intermediate values and/or intervals are also possible here. Channel height regions of this type in the region of the increased rib passage 72 can make a particularly efficient meandering flow from one rib intermediate region 70 to an adjacent rib intermediate region 70 possible. In order to produce the second cooling flow 84, it is advantageous if the channel height 46 in the region of the increased rib passage 72 is at least greater than the channel height 46 in the region of the reduced rib passage 74. The channel height 46 of the cooling channel 40 in a region of the reduced rib passage 74 is particularly preferably at most 1.0 mm. In alternative embodiments, a channel height 46 of the cooling channel 40 in a region of the reduced rib passage 74 can be at most 3.0 mm and preferably at most 2.0 mm. In embodiments, a channel height 46 of the cooling channel 40 in a region of the reduced rib passage 74 can be between 0.5 mm and 5.0 mm, preferably between 0.5 mm and 4.0 mm, or between 0.5 mm and 2.5 mm. In particularly advantageous embodiments, a channel height 46 of the cooling channel 40 in a region of the reduced rib passage 74 can be, for example, 1.0 mm±0.5 mm, or 1.5 mm±0.5 mm. Intermediate values and/or intervals are also possible here. Channel height regions of this type in the region of the reduced rib passage 74 can make a reliable circumferential flow with only moderate pressure losses and, at the same time, effective lateral flow guidance possible. In order to produce the second cooling flow 84, it is advantageous if the channel height 46 in the region of the reduced rib passage 74 is at least smaller than the channel height 46 in the region of the increased rib passage 72.

In embodiments, an increased rib passage 72 or a reduced rib passage 74 can be configured in addition or as an alternative in the middle rib portion 55, if present. For example, transverse ribs 50 can also be included which have the increased rib passage 72 in the middle rib portion 55. In other words, at least some transverse ribs 50 can protrude to a lesser extent in the axial direction 2 into the cooling channel 40 in one of a radially inner rib portion 52, a middle rib portion 55 or a radially outer rib portion 54 than in the respective other rib portions 52, 54, 55, in order to form the increased rib passage 72.

As is apparent, in particular, from FIG. 4 and FIG. 5b, the transverse ribs 50 are configured and arranged in such a way that, at least between two adjacent fastening indentations 26, the increased rib passage 72 between adjacent transverse ribs 50 is arranged in an alternating manner on the respective radially inner rib portion 52 and on the respective radially outer rib portion 54. In an analogous manner, the reduced rib passages 74 are arranged in an alternating manner on radially outer and radially inner rib portions 52, 54. For example, one transverse rib 50 has its increased rib passage 72 on its radially inner rib portion 52, and an adjacent transverse rib 50 has its reduced rib passage 74 on its radially inner rib portion 52. By way of an arrangement of this type, a directional change of the laterally meandering second cooling flow 84 between in each case two adjacent transverse ribs 50 can be made possible. As a result, by way of the rib intermediate region 70, the second cooling flow 84 can flow during operation laterally from one increased rib passage 72 to an adjacent increased rib passage 72. Here, during operation, the second cooling flow 84 can flow radially outwards or radially inwards from one increased rib passage 72 to an adjacent increased rib passage 72. The meandering second cooling flow 84 can flow between the transverse ribs 50 in a deeper region of the cooling channel 40, that is to say closer to the rib base (where the transverse rib emerges from the first wall portion 22a, 24a). At the same time, the circumferential first cooling flow 82 can flow in an upper region of the cooling channel 40, with the result that satisfactory thorough mixing can be provided by way of the two flows which interact with one another.

In refinements, the transverse ribs 50 which are adjacent in each case with respect to a fastening indentation 26 can have configured the increased rib passage 72 on their respective radially outer rib portion 54 (see FIG. 4). Transverse ribs 50 which are adjacent with respect to a fastening indentation 26 can be understood to mean those transverse ribs 50 which are arranged closest to a fastening indentation 26 and have a rib intermediate region 70 with a maximum channel width 43 on the two circumferential sides in comparison with a channel width 43 which is reduced by way of the fastening indentation 26. As a result of this advantageous embodiment, improved flushing of the corners of the fastening indentation 26 with cooling fluid can be achieved during operation. In addition, a formation of bubbles and dead zones of cooling fluid flow can be prevented or at least reduced.

In embodiments, only some, a plurality of or a large part of the transverse ribs 50 can also have an increased rib passage 72 and/or a reduced rib passage 74. In embodiments, only a large part of the transverse ribs 50 which have an increased rib passage 72 might be configured and arranged adjacently with respect to one another in such a way that the increased rib passage 72 between adjacent transverse ribs 50 is configured in an alternating manner on the respective radially inner rib portion 52 and on the respective radially outer rib portion 54. In embodiments with a middle rib portion 55, the increased rib passage 72 between adjacent transverse ribs might also be configured in an alternating manner in the middle rib portion 55 and one of the radially inner rib portion 52 or the radially outer rib portion 54. As a result of increased rib passages 72 even in the middle rib portion 55, a more pronounced circumferential component and a lower pressure loss of the fluid flow can be achieved. A large part can comprise more than 50%, more than 60%, in particular more than 70% or 80% of the transverse ribs 50. In embodiments, a large part can comprise at least 90 or 95% of the transverse ribs 50. In particular, changes of the arrangement point of the increased rib passage 72 can be provided on every or every second transverse rib 50.

As can be seen, in particular, in FIG. 4, FIG. 5b and FIG. 6a, flow guiding arrangements 60 are configured in the rib intermediate regions 70. The flow guiding arrangement 60 protrudes from the first wall portion 22a in the axial direction 2 into the cooling channel 40. In particular, the flow guiding arrangement 60 protrudes into the cooling channel 40 to a lesser extent than the transverse ribs 50. Here, the flow guiding arrangement 60 is configured in the first wall portion 22a, 24a. The flow guiding arrangement 60 extends between the two adjacent transverse ribs 50, in the rib intermediate region 70 which is formed by way of these adjacent transverse ribs 50. The flow guiding arrangement 60 comprises an undulating surface with a plurality of undulations. Expressed in an alternative way, the undulating surface comprises peaks and troughs, the peaks and troughs of the undulating surface being arranged in an alternating manner along the rib intermediate region 70 as viewed in the radial direction 4. Here, the peaks and troughs extend substantially in the circumferential direction 6 between adjacent transverse ribs 50. The flow guiding arrangement 60 can increase the surface area for cooling in a particularly efficient way, and can contribute to improved thorough mixing of the cooling fluids. In addition, the flow guiding arrangement 60 can swirl the second cooling flow 84 which flows in the radial direction 4 through the respective rib intermediate region 70. In alternative embodiments, no flow guiding arrangements 60 can also be provided. Flow guiding arrangements 60 can also be provided only in individual or a plurality of rib intermediate regions 70. The flow guiding arrangements 60 can also comprise fewer or more undulations, in particular only one undulation, for example in each case one trough and one peak or a combination of a trough and a peak. In refinements, the flow guiding arrangement 60 can extend in rib form from one transverse rib 50 to an adjacent transverse rib 50. Here, the flow guiding arrangement 60 can extend in rib form from the one to the other transverse rib 50. As an alternative to the undulations, webs might also be configured which extend in a rod-shaped manner between adjacent transverse ribs 50. In embodiments, the flow guiding arrangement 60 can protrude only partially in the circumferential direction 6 into the rib intermediate region 70. For example, the flow guiding arrangement 60 can protrude in an alternating manner from one transverse rib 50 and an adjacent transverse rib 50 into the rib intermediate region, in order to produce a meandering flow within the rib intermediate region 70. As an alternative or in addition, a flow guiding arrangement 60 can also protrude from the second wall portion 22b, 24b in the axial direction 2 into the cooling channel 40.

The cooling channel 40 with the transverse ribs 50 or the first wall portion 22a, 24a and/or the second wall portion 22b, 24b can be produced in a die casting method. In particular, the first wall portion 22a, 24a and/or the second wall portion 22b, 24b can be produced by way of a low-pressure die casting method. Geometries without sharp edges can be configured in the wall portion 22a, 22b, 24a, 24b by way of the production of the wall portion 22a, 22b, 24a, 24b with the transverse ribs 50 which are arranged in the cooling channel 40 and/or the flow guiding arrangement 60 in a die casting method. For example, the geometries, in particular the transverse ribs 50 and/or the flow guiding arrangement 60 can be configured with rounded portions with radii of greater than 1 mm, in particular greater than 2 mm and preferably greater than 3 mm. In particular, geometries with radii between 1 mm and 6 mm, preferably between 2 mm and 5 mm and particularly preferably between 2 mm and 4 mm, or between 3 mm and 4 mm can be produced by way of the die casting method. Simple, inexpensive manufacturing, suitable for mass production, of the complex cooling channel geometry can be provided by way of the wall portion 22*a*, 22*b*, 24*a*, 24*b* which is produced using the die casting method, in particular using the low-pressure die casting method.

In preferred embodiments, the first wall portion 22*a*, 24*a* or housing cover 22*a*, 24*a* is produced in a die casting method, in particular in a low-pressure die casting method. The second wall portion 22*b*, 24*b* or cooling cover 22*b*, 24*b* is preferably manufactured from a sheet metal part. The cooling cover 22*b*, 24*b* can preferably be inserted into a depression of the housing cover 22*a*, 24*a*. As an alternative or in addition, in preferred embodiments, the cooling cover 22*b*, 24*b* can be fastened to the housing cover 22*a*, 24*a* by way of friction stir welding. The cooling cover 22*b*, 24*b* can preferably be manufactured from aluminium. In alternative embodiments, the cooling cover 22*b*, 24*b* can be made from a different material than aluminium and/or can be fastened to the housing cover 22*a*, 24*a* by way of a different fastening means than a friction stir welding connection. For example, the cooling cover 22*b*, 24*b* can be fastened to and/or oriented on the housing cover 22*a*, 24*a* by way of laser welding, by way of a screw connection, by way of clamping, by way of a plug connection and/or by way of adhesive bonding or another integrally joined, positively locking and/or non-positive fastening means.

Figure 3B:
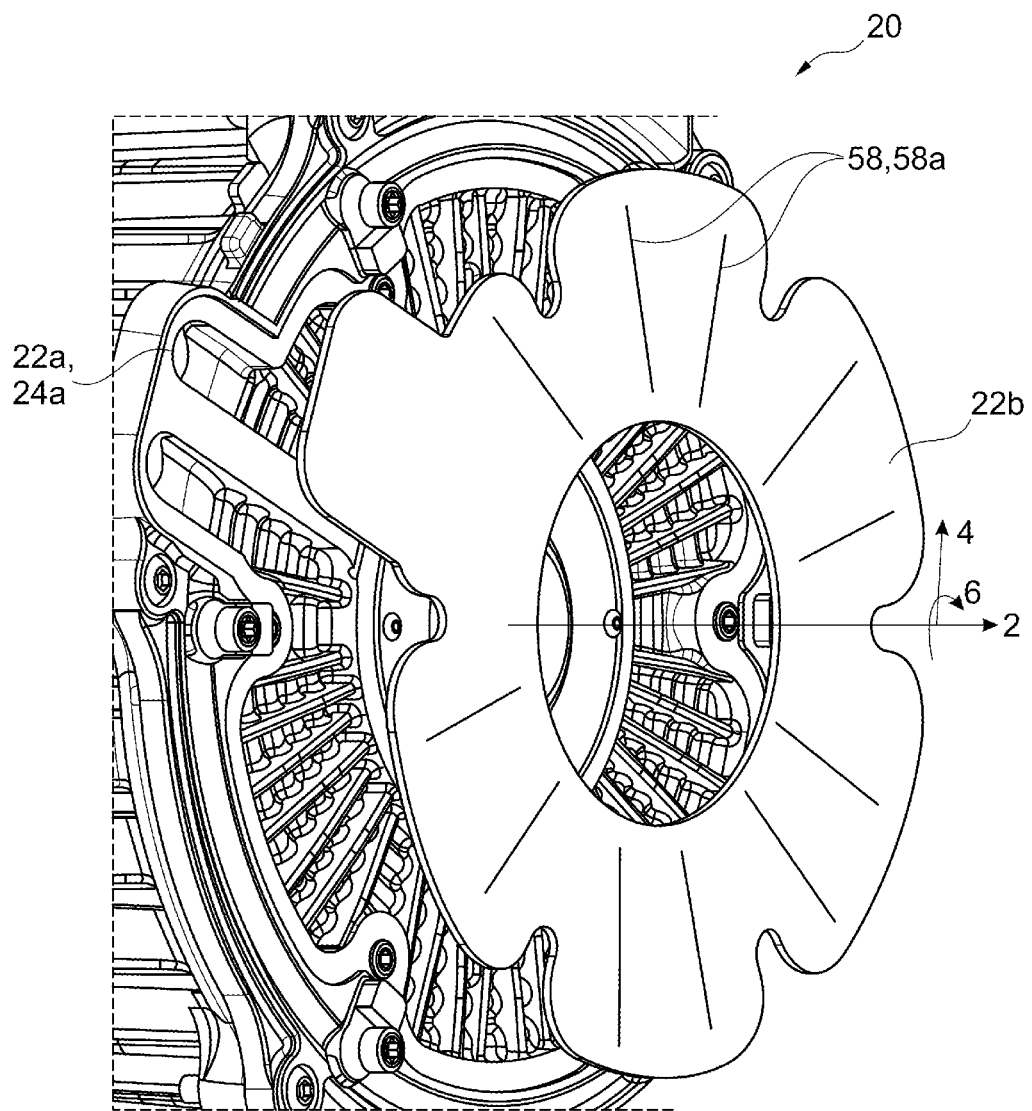
FIG. 3b shows the same perspective illustration as FIG. 3a with a partially visible cooling channel and a cooling channel cover with reinforcing elements.

As shown in FIG. 3*b*, the cooling cover 22*b*, 24*b* comprises a plurality of reinforcing elements 58 in the form of an elevation 58*a*. The reinforcing elements 58 are configured spaced apart in the circumferential direction 6 in the cooling cover 22*b*, 24*b*, in particular are stamped in. The elevation 58*a* is to be understood in such a way that it protrudes in the axial direction 2 from the cooling cover 22*b*, 24*b* into the cooling channel 40. The elevation 58*a* is configured on a surface, facing the cooling channel 40, of the cooling cover 22*b*, 24*b*, with the result that the cooling surface area is increased. The reinforcing element 58 extends in the radial direction 4, and is arranged between two adjacent transverse ribs 50. In particular, in the installed state of the cooling cover 22*b*, 24*b*, the elevation 58*a* can be arranged between two adjacent transverse ribs 50, with the result that the elevation 58*a* protrudes into a rib intermediate space 70. The cooling cover 22*b* is stamped in order to form the reinforcing elements 58. In other words, the reinforcing element 58 is stamped into the cooling cover 22*b*, 24*b*. Therefore, the rear side of the elevation 58*a* can be seen in FIG. 3*b*. Firstly, the structural stability of the motor housing 20, in particular that of the cooling cover 22*b*, 24*b*, can be increased by way of the reinforcing element 58, in particular in the case of applications in mobile applications. In addition, the reinforcing element, in particular if it comprises at least one elevation and/or depression, can contribute to an increase in the surface area, for example a surface area of the cooling channel or of an outer cover surface, and can contribute to an improvement of the cooling effect, as a result. In alternative embodiments, the cooling cover 22*b*, 24*b* can also comprise only one reinforcing element 58 or a greater number of reinforcing elements 58 than illustrated in FIG. 3*b*. For example, as many reinforcing elements 58 can be provided as there are rib intermediate regions 70. In embodiments, a reinforcing element 58 can comprise at least one elevation 58*a* and/or at least one depression. In addition or as an alternative to the at least one reinforcing element 58, one, a plurality of or all the transverse ribs 50 and/or one, a plurality of or all the flow guiding arrangements 60 can be arranged on the cooling cover 22*b*, 24*b*, for example can be configured in the latter.

With reference to FIG. 3*a* and FIG. 4, the inlet 41*a* and the outlet 41*b* can be arranged adjacently in the circumferential direction 6. In addition, the inlet 41*a* and the outlet 41*b* can be separated fluidically by way of a web 48. Here, the web 48 can be configured in the housing portion 22, 24. In particular, the web 48 can run in the radial direction. A bypass 47 can be configured in the web 48, which bypass 47 fluidically connects an inlet region of the cooling channel 40 directly to an outlet region of the cooling channel 40. The bypass 47 can be dimensioned in such a way that only a minimum part volumetric flow, for example less than 5%, in particular less than 2.5% or less than 1% of the entire cooling volumetric flow, is conducted through the bypass 47. Facilitation of the emptying of the cooling channel 40 in the installed position of the fan 1 can be made possible by way of the bypass 47. In the installed position of the fan 1, the motor housing 20 or the cooling channel 40 can be oriented in accordance with FIG. 5*a* and FIG. 5*b*, the weight being directed from the top to the bottom in these figures. The bypass 47 is advantageous, in particular, in combination with a closable emptying opening (not shown) in the lower region of the motor housing 20 which is shown in FIG. 5*a* and FIG. 5*b*. As can likewise be gathered from FIG. 5*a* and FIG. 5*b*, the inlet 41*a* and/or the outlet 41*b* can be arranged radially outside the cooling channel 40, for example offset radially to the outside, and can be connected fluidically to the cooling channel 40 via corresponding radial inflow and outflow regions. As a result, a facilitation of the connectors for the cooling fluid inlet 29*a* and the cooling fluid outlet 29*b* and/or a simplified distribution of cooling fluid to other housing parts can be achieved.

Although the present invention has been described above and is defined in the appended claims, it should be understood that, as an alternative, the invention can also be defined in accordance with the following embodiments:

1. Motor housing (20) for an axial flux motor (10) comprising:
    at least one housing portion (22, 24) which is of at least partially double-walled configuration, in order to configure an internal cooling channel (40) in the housing portion (22, 24),
    the cooling channel (40) extending in a substantially annular manner in the circumferential direction (6) between an inlet (41*a*) and an outlet (41*b*), in order, during operation, to produce a first cooling flow (82) which flows substantially in the circumferential direction (6) through the cooling channel (40), the cooling channel (40) comprising a plurality of transverse ribs (50).
2. Motor housing (20) according to embodiment 1, the transverse ribs (50) extending along a rib width (53) laterally with respect to the circumferential direction (6).
3. Motor housing (20) according to embodiment 2, the transverse ribs (50) extending along the rib width (53) in a substantially radial direction (4).
4. Motor housing (20) according to either one of embodiments 2 and 3, the transverse ribs (50) extending along their rib width (53) at least partially between a first lateral channel wall (42) and a second lateral channel wall (44) of the cooling channel (40).
5. Motor housing (20) according to any one of embodiments 2 to 4, the transverse ribs (50) extending along their rib width (53) at least partially between a radially inner channel wall (42) and a radially outer channel wall (44) of the cooling channel (40).
6. Motor housing (20) according to any one of the preceding embodiments, the plurality of transverse ribs (50) being configured and protruding into the cooling channel (40) so as, during operation, to produce a second cooling flow (84) which flows through the cooling channel (40) in a laterally meandering manner with respect to the first cooling flow (82).
7. Motor housing (20) according to embodiment 6, the transverse ribs (50) protruding along a rib height (56) in the axial direction (2) into the cooling channel (40) in such a way that, during operation, the second cooling flow (84) flows through the cooling channel (40) in a laterally meandering manner between a radially inner region of the cooling channel (40) and a radially outer region of the cooling channel (40).
8. Motor housing (20) according to any one of the preceding embodiments, the housing portion (22, 24) comprising a first wall portion (22a, 24a) and a second wall portion (22b, 24b), the cooling channel (40) being formed between the first wall portion (22a, 24a) and the second wall portion (22b, 24b).
9. Motor housing (20) according to embodiment 8, the transverse ribs (50) protruding from one of the first wall portion (22a) and/or the second wall portion (22b) in the axial direction (2) into the cooling channel (40), with the result that a channel height (46) of the cooling channel (40) is reduced in the region of a respective transverse rib (50).
10. Motor housing (20) according to either one of embodiments 8 and 9, at least some of the transverse ribs (50) protruding from one of the first wall portion (22a) and/or the second wall portion (22b) in the axial direction (2) towards the other wall portion (22a, 22b) into the cooling channel (40) only to such an extent that they are still spaced apart from the other wall portion (22a, 22b).
11. Motor housing (20) according to any one of the preceding embodiments, at least some transverse ribs (50) in one of a radially inner rib portion (52) or a radially outer rib portion (54) protruding to a lesser extent in the axial direction (2) into the cooling channel (40) than in the respective other rib portion (52, 54), in order to form an increased rib passage (72).
12. Motor housing (20) according to embodiment 11, a channel height (46) of the cooling channel (40) being greater in a region of the increased rib passage (72) than in a region of the respective other rib portion (52, 54).
13. Motor housing (20) according to either one of embodiments 11 and 12, a channel height (46) of the cooling channel (40) in a region of the increased rib passage (72) being at least 1.0 mm, preferably at least 2.0 mm, and particularly preferably at least 3.0 mm.
14. Motor housing (20) according to any one of embodiments 11 to 13, the at least some transverse ribs (50) in the respective other rib portion (52, 54) forming a reduced rib passage (74).
15. Motor housing (20) according to embodiment 14, a channel height (46) of the cooling channel (40) being smaller in a region of the reduced rib passage (74) than in a region of the increased rib passage (72).
16. Motor housing (20) according to either one of embodiments 14 and 15, a channel height (46) of the cooling channel (40) in a region of the reduced rib passage (74) being at most 3.0 mm, preferably at most 2.0 mm, and particularly preferably at most 1.0 mm.
17. Motor housing (20) according to any one of embodiments 11 to 16 if at least dependent on embodiment 2, the at least some transverse ribs (50) protruding over their entire rib width (53) in the axial direction (2) only to such an extent into the cooling channel (40) that a channel height (46a) of the cooling channel (40) over the entire rib width (53) is at least greater than 0.0 mm.
18. Motor housing (20) according to embodiment 17, the channel height (46) of the cooling channel (40) over the entire rib width being at least 0.5 mm, preferably at least 1.0 mm, and particularly preferably at least 1.5 mm.
19. Motor housing (20) according to any one of the preceding embodiments if at least dependent on embodiment 11, at least two transverse ribs (50) of the at least some transverse ribs (50) being configured and arranged adjacently in such a way that the increased rib passage (72) of the one of the two transverse ribs (50) and the reduced rib passage (74) of the other one of the two transverse ribs is arranged on the respective radially inner rib portion (52) or on the respective radially outer rib portion (54).
20. Motor housing (20) according to any one of the preceding embodiments if at least dependent on embodiment 6, a rib intermediate region (70) being configured between in each case two adjacent transverse ribs (50), through which rib intermediate region (70), during operation, the second cooling flow (84) can flow laterally, in particular radially to the outside or radially to the inside, from one increased rib passage (72) to an adjacent increased rib passage (72).
21. Motor housing (20) according to any one of the preceding embodiments if at least dependent on embodiment 11, a large part of the at least some transverse ribs (50) being configured and arranged adjacently with respect to one another in such a way that the increased rib passage (72) between adjacent transverse ribs (50) is configured in an alternating manner on the respective radially inner rib portion (52) and on the respective radially outer rib portion (54).
22. Motor housing (20) according to any one of the preceding embodiments, a rib intermediate region (70) being configured in each case between two adjacent transverse ribs (50).
23. Motor housing (20) according to embodiment 22 if at least dependent on embodiment 11, the increased rib passages (72) providing a passage from one rib intermediate region (70) to an adjacent rib intermediate region (70).
24. Motor housing (20) according to either one of embodiments 22 and 23, a flow guiding arrangement (60) being configured in at least one rib intermediate region (70).
25. Motor housing (20) according to embodiment 23 if at least dependent on embodiment 6, the flow guiding arrangement (60) being configured to swirl the second cooling flow (84) which flows laterally with respect to the circumferential direction (6), in particular in the radial direction (4).
26. Motor housing (20) according to either one of embodiments 24 and 25, the flow guiding arrangement (60) comprising an undulating surface.

27. Motor housing (20) according to any one of embodiments 24 to 26 if at least dependent on embodiment 8, the flow guiding arrangement (60) protruding from one of the first wall portion (22a) and/or the second wall portion (22b) in the axial direction (2) into the cooling channel (40).

28. Motor housing (20) according to any one of embodiments 24 to 27, the flow guiding arrangement (60) protruding from one or from both of the two adjacent transverse ribs (50) into the rib intermediate region (70) which is formed by way of these adjacent transverse ribs (50).

29. Motor housing (20) according to any one of the preceding embodiments, the cooling channel (40) being delimited in the radial direction (4) along a channel width (43) by way of a radially inner channel wall (42) and by way of a radially outer channel wall (44).

30. Motor housing (20) according to any one of the preceding embodiments, the housing portion (22, 24) comprising a plurality of fastening indentations (26) which are distributed in the circumferential direction (6) for attaching a stator (36) to the housing portion (22, 24).

31. Motor housing (20) according to embodiment 30 if at least dependent on embodiment 29, the radially outer channel wall (44) being offset inwards in the radial direction (4) in a respective portion of the fastening indentations (26) by way of the latter.

32. Motor housing (20) according to either one of embodiments 30 and 31 if at least dependent on embodiment 11, the at least some transverse ribs (50) between two adjacent fastening indentations (26) being configured and arranged adjacently with respect to one another in such a way that the increased rib passage (72) between adjacent transverse ribs (50) is arranged in an alternating manner on the respective radially inner rib portion (52) and on the respective radially outer rib portion (54).

33. Motor housing (20) according to any one of embodiments 30 to 32 if at least dependent on embodiment 11, the transverse ribs (50) which are adjacent in each case with respect to a fastening indentation (26) having configured the increased rib passage (72) on their respective radially outer rib portion (54).

34. Motor housing (20) according to any one of the preceding embodiments, the housing portion (22, 24) comprising a depression (28) for arranging a stator (36).

35. Motor housing (20) according to embodiment 34, the cooling channel (40) being arranged and configured in such a way that it overlaps the depression (28) in the radial direction (4).

36. Motor housing (20) according to any one of the preceding embodiments, the cooling channel (40) extending in a substantially annular manner in the circumferential direction (6) over a region of approximately between 30° and approximately 360°.

37. Motor housing (20) according to any one of the preceding embodiments, a plurality of internal cooling channels (40) being configured in the housing portion (22, 24).

38. Motor housing (20) according to embodiment 37, the plurality of internal cooling channels (40) being arranged adjacently in the circumferential direction (6).

39. Motor housing (20) according to either one of embodiments 37 and 38, the plurality of internal cooling channels (40) in each case having a dedicated inlet (41a) and/or outlet (41b).

40. Motor housing (20) according to any one of the preceding embodiments, the inlet (41a) and the outlet (41b) being arranged adjacently in the circumferential direction (6).

41. Motor housing (20) according to embodiment 40, the inlet (41a) and the outlet (41b) being separated fluidically by way of a web (48).

42. Motor housing (20) according to embodiment 41, a bypass (47) being configured in the web (48), which bypass (47) fluidically connects an inlet region of the cooling channel (40) directly to an outlet region of the cooling channel (40).

43. Motor housing (20) according to any one of the preceding embodiments, the housing portion (22, 24) being of substantially disc-shaped configuration.

44. Motor housing (20) according to any one of the preceding embodiments, the housing portion (22, 24) being arranged at an axial end (20a, 20b) of the motor housing (20).

45. Motor housing (20) according to any one of the preceding embodiments, comprising, furthermore, a central housing (21) for receiving a shaft (32), a rotor (34) and a stator (36) of the axial flux machine (10), the central housing (21) having an axial housing opening at a first axial end (20a).

46. Motor housing (20) according to embodiment 45, the housing portion (22) being configured as a housing cover (22a) and being arranged at the axial housing opening, in order to close the latter.

47. Motor housing (20) according to embodiment 46 if at least dependent on embodiment 8, the first wall portion (22a) of the housing portion (22) being configured as a housing cover (22a), and/or the second wall portion (22b) being configured as a cooling cover (22b) for closing the cooling channel (40).

48. Motor housing (20) according to embodiment 47, the cooling cover (22b) being manufactured from a sheet metal part, in particular from aluminium.

49. Motor housing (20) according to either one of embodiments 47 and 48, the cooling cover (22b) being fastened to the housing cover (22a) by way of friction stir welding.

50. Motor housing (20) according to any one of embodiments 47 to 49, the cooling cover (22b) comprising at least one reinforcing element (58).

51. Motor housing (20) according to embodiment 50, the reinforcing element (58) comprising at least one elevation (58a) and/or at least one depression.

52. Motor housing (20) according to either one of embodiments 50 and 51, the reinforcing element (58) being arranged between two adjacent transverse ribs (50).

53. Motor housing (20) according to any one of embodiments 50 to 52, the cooling cover (22b) being stamped, in order to form the at least one reinforcing element (58).

54. Motor housing (20) according to any one of the preceding embodiments, comprising at least two housing portions (22, 24) which in each case comprise at least one internal cooling channel (40).

55. Motor housing (20) according to embodiment 54, a first housing portion (22) of the two housing portions (22, 24) being arranged at a first axial end (20a) of the motor housing (20), and a second housing portion (24) of the two housing portions (22, 24) being arranged at a second axial end (20b).

56. Motor housing (20) according to either one of embodiments 54 and 55, at least one first wall portion (24a) of the second housing portion (24) being manufactured integrally with a central housing (21), or at least one first wall portion (24a) of the second housing portion (24) being a component separately from the central housing (21) and being fastened to the latter.

57. Motor housing (20) according to any one of embodiments 54 to 56, comprising at least one further housing portion which is arranged between the first housing portion (22) and the second housing portion (24) and comprises at least one internal cooling channel (40).

58. Axial flux motor (10) for a fan (1) comprising:
 a motor housing (20) according to any one of the preceding embodiments,
 a shaft (32) which is mounted rotationally in the motor housing (20),
 at least one rotor (34) which is arranged fixedly on the shaft (32) in the motor housing (20) for conjoint rotation,
 at least one stator (36) which is arranged axially adjacently with respect to the rotor (34) in the motor housing (20).

59. Axial flux motor (10) according to embodiment 58, the stator (36) comprising an annular stator yoke (37) and a plurality of stator teeth which extend in the axial direction (2) from the stator yoke (37) in a manner which is distributed in the circumferential direction (6).

60. Axial flux motor (10) according to either one of embodiments 58 and 59, the rotor (34) comprising a plurality of permanent magnets which are arranged distributed in the circumferential direction (6).

61. Axial flux motor (10) according to embodiment 60, the permanent magnets being configured in such a way that they in each case form at least one magnetic pole in the axial direction (2).

62. Axial flux motor (10) according to any one of embodiments 58 to 61, the axial flux motor (10) being configured as a high-voltage axial flux motor for a high-voltage fan (1) of an electric vehicle.

63. Axial flux motor (10) according to any one of embodiments 58 to 62, the at least one stator (36) being arranged on, in particular fastened to, the at least one housing portion (22, 24).

64. Axial flux motor (10) according to any one of embodiments 58 to 63, comprising two stators (36), between which the rotor (34) is arranged.

65. Axial flux motor (10) according to any one of embodiments 58 to 64, comprising at least three stators (36) and at least two rotors (34) which are arranged in each case between two stators (36).

66. High-voltage fan (1) for an electric vehicle comprising:
 an axial flux motor (10) according to any one of embodiments 58 to 65, and
 a fan impeller (30) which is arranged fixedly on the shaft (32) outside the motor housing (20) for conjoint rotation.

LIST OF REFERENCE SIGNS

R Axis of rotation
1 Fan
2 Axial direction
4 Radial direction
6 Circumferential direction
10 Axial flux motor
20 Motor housing
20a First axial end
20b Second axial end
21 Central housing
22 First housing portion
24 Second housing portion
22a, 24a First wall portion (housing cover)
22b, 24b Second wall portion (cooling cover)
26 Fastening indentations
28 Stator depression
29a, 29b Cooling fluid inlet, cooling fluid outlet
30 Fan impeller
32 Shaft
34 Rotor
36 Stator
37 Stator yoke
38 Yoke width
40 Cooling channel
41a Inlet
41b Outlet
42 First lateral channel wall; radially inner wall
43 Channel width
44 Second lateral channel wall; radially outer wall
46 (46a/46b) Channel height (reduced/increased)
47 Bypass
48 Web
50 Transverse ribs
52 Radially inner rib portion
53 Rib width
54 Radially outer rib portion
55 Middle rib portion
56 (56a/56b) Rib height (minimum/maximum)
58 Reinforcing element
58a Elevation
60 Flow guiding arrangement
70 Rib intermediate region
72 Increased rib passage
74 Reduced rib passage
82 First cooling flow
84 Second cooling flow

The invention claimed is:

1. A motor housing (20) for an axial flux motor (10) comprising:
 at least one housing portion (22, 24) which is of at least partially double-walled configuration, in order to configure an internal cooling channel (40) in the housing portion (22, 24),
 the cooling channel (40) extending in a substantially annular manner in the circumferential direction (6) between an inlet (41a) and an outlet (41b), in order, during operation, to produce a first cooling flow (82) which flows substantially in the circumferential direction (6) through the cooling channel (40), the cooling channel (40) comprising a plurality of transverse ribs (50), at least some transverse ribs (50) protruding into the cooling channel (40) in the axial direction (2) to a lesser extent in one of a radially inner rib portion (52) or a radially outer rib portion (54) than in the respective other rib portion (52, 54), in order to form an increased rib passage (72).

2. The motor housing (20) according to claim 1, the transverse ribs (50) extending along a rib width (53) in a substantially radial direction (4) with respect to the circumferential direction (6).

3. The motor housing (20) according to claim 1, the plurality of transverse ribs (50) being configured and protruding into the cooling channel (40) so as, during operation, to produce a second cooling flow (84) which flows through the cooling channel (40) in a laterally meandering manner with respect to the first cooling flow (82).

4. The motor housing (20) according to claim 1, the housing portion (22, 24) comprising a first wall portion (22a, 24a) and a second wall portion (22b, 24b), the cooling channel (40) being formed between the first wall portion (22a, 24a) and the second wall portion (22b, 24b).

5. The motor housing (20) according to claim 1, the at least some transverse ribs (50) in the respective other rib portion (52, 54) forming a reduced rib passage (74).

6. The motor housing (20) according to claim 1, the housing portion (22, 24) comprising a plurality of fastening indentations (26), distributed in the circumferential direction (6), for attaching a stator (36) to the housing portion (22, 24), and the transverse ribs (50) which are adjacent in each case with respect to a fastening indentation (26) having configured the increased rib passage (72) on their respective radially outer rib portion (54).

7. The motor housing (20) according to claim 1, comprising at least two housing portions (22, 24) which comprise in each case at least one internal cooling channel (40).

8. An axial flux motor (10) for a fan (1) comprising:
a motor housing (20) according to claim 1,
a shaft (32) which is mounted rotationally in the motor housing (20),
at least one rotor (34) which is arranged fixedly on the shaft (32) in the motor housing (20) for conjoint rotation,
at least one stator (36) which is arranged axially adjacently with respect to the rotor (34) in the motor housing (20).

9. A high-voltage fan (1) for an electric vehicle comprising:
an axial flux motor (10) according to claim 8, and
a fan impeller (30) which is arranged fixedly on the shaft (32) outside the motor housing (20) for conjoint rotation.

10. A motor housing (20) for an axial flux motor (10) comprising:
at least one housing portion (22, 24) which is of at least partially double-walled configuration, in order to configure an internal cooling channel (40) in the housing portion (22, 24),
the cooling channel (40) extending in a substantially annular manner in the circumferential direction (6) between an inlet (41a) and an outlet (41b), in order, during operation, to produce a first cooling flow (82) which flows substantially in the circumferential direction (6) through the cooling channel (40), the cooling channel (40) comprising a plurality of transverse ribs (50), a rib intermediate region (70) being configured between in each case two adjacent transverse ribs (50), and a flow guiding arrangement (60) being configured in at least one rib intermediate region (70).

11. The motor housing (20) according to claim 10, the flow guiding arrangement (60) comprising an undulating surface.

12. A motor housing (20) for an axial flux motor (10) comprising:
at least one housing portion (22, 24) which is of at least partially double-walled configuration, in order to configure an internal cooling channel (40) in the housing portion (22, 24),
the cooling channel (40) extending in a substantially annular manner in the circumferential direction (6) between an inlet (41a) and an outlet (41b), in order, during operation, to produce a first cooling flow (82) which flows substantially in the circumferential direction (6) through the cooling channel (40), the cooling channel (40) comprising a plurality of transverse ribs (50),
the housing portion (22, 24) comprising a first wall portion (22a, 24a) and a second wall portion (22b, 24b), the cooling channel (40) being formed between the first wall portion (22a, 24a) and the second wall portion (22b, 24b),
comprising, furthermore, a central housing (21) for receiving a shaft (32), a rotor (34) and a stator (36) of the axial flux machine (10), the central housing (21) having an axial housing opening at a first axial end (20a), the housing portion (22) being configured as a housing cover (22a) and being arranged at the axial housing opening in order to close the latter, and the first wall portion (22a) of the housing portion (22) being configured as a housing cover (22a), and the second wall portion (22b) being configured as a cooling cover (22b) for closing the cooling channel (40).

13. The motor housing (20) according to claim 12, the cooling cover (22b) being fastened to the housing cover (22a) by way of friction stir welding.

14. The motor housing (20) according to claim 12, the cooling cover (22b) comprising at least one reinforcing element (58), and the reinforcing element (58) comprising at least one elevation (58a) or at least one depression.

* * * * *